(12) United States Patent
Oogami

(10) Patent No.: US 7,241,530 B2
(45) Date of Patent: *Jul. 10, 2007

(54) MODULE BATTERY

(75) Inventor: Etsuo Oogami, Atsugi (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 737 days.

This patent is subject to a terminal disclaimer.

(21) Appl. No.: 10/608,133

(22) Filed: Jun. 30, 2003

(65) Prior Publication Data

US 2004/0016455 A1    Jan. 29, 2004

(30) Foreign Application Priority Data

| Jul. 23, 2002 | (JP) | .............................. 2002-214022 |
| Jul. 23, 2002 | (JP) | .............................. 2002-214104 |
| Jul. 23, 2002 | (JP) | .............................. 2002-214163 |

(51) Int. Cl.
 *H01M 2/24* (2006.01)
 *H01M 2/08* (2006.01)
 *H01M 10/50* (2006.01)

(52) U.S. Cl. ...................... 429/159; 429/120; 429/160; 429/162; 429/181

(58) Field of Classification Search ................ 429/120, 429/130, 152, 153, 154, 155, 156, 157, 158, 429/159, 160, 162, 181
See application file for complete search history.

(56) References Cited

U.S. PATENT DOCUMENTS 5,470,679 A * 11/1995 Lund et al. ............. 429/156 X
6,512,347 B1 * 1/2003 Hellmann et al. ...... 429/120 X
6,899,975 B2 * 5/2005 Watanabe et al. ........... 429/156
7,074,517 B2 * 7/2006 Higashino ............... 429/156 X
2005/0031946 A1 * 2/2005 Kruger et al. .............. 429/159

FOREIGN PATENT DOCUMENTS

| JP | 9-086188 A | 3/1997 |
| JP | 11-180169 A | 7/1999 |
| JP | 2001-114157 A | 4/2001 |
| JP | 2001-143768 A | 5/2001 |
| JP | 2001-256934 A | 9/2001 |
| JP | 2002-157982 A | 5/2002 |

OTHER PUBLICATIONS

U.S. Appl. No. 10/608,132, filed Jun. 30, 2003, Higashino.
U.S. Appl. No. 10/608,134, filed Jun. 30, 2003, Oogami.
U.S. Appl. No. 10/603,782, filed Jun. 26, 2003, Oogami.

* cited by examiner

*Primary Examiner*—Stephen J. Kalafut
(74) *Attorney, Agent, or Firm*—Foley & Lardner LLP

(57) ABSTRACT

A module battery comprises cells each having an electric power generating element hermetically sealed in a package film, and cell holders on each of which each of the cells is mounted and held. The cell holders are formed in configurations so as to allow the cell holders to be freely stacked in a plurality of stages while permitting the cells to be retained thereon and to allow electrode tabs of the cells to be exposed between the cell holders neighboring in a stacking direction. Thus, the module battery can be formed in an easy assembly work.

12 Claims, 20 Drawing Sheets

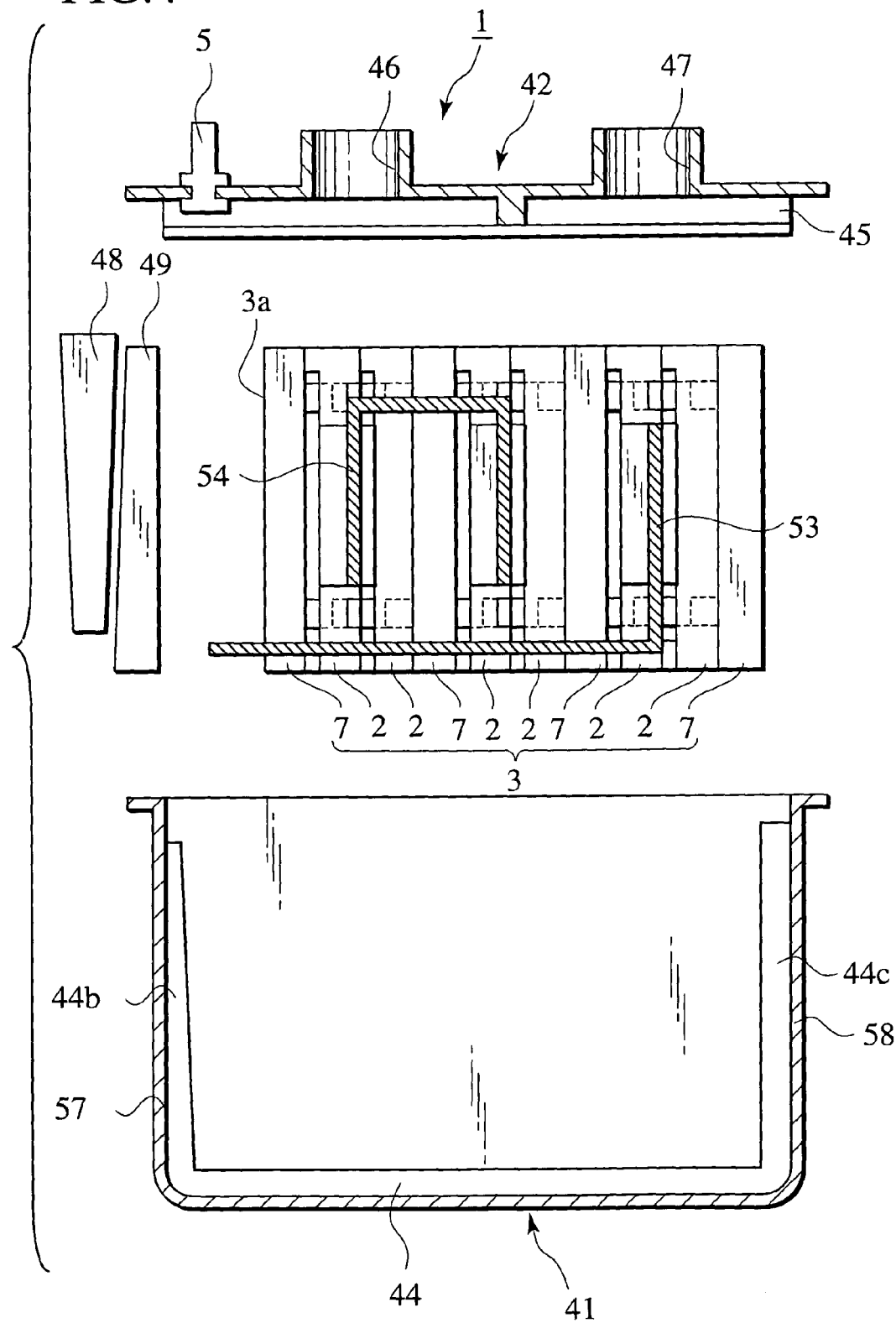

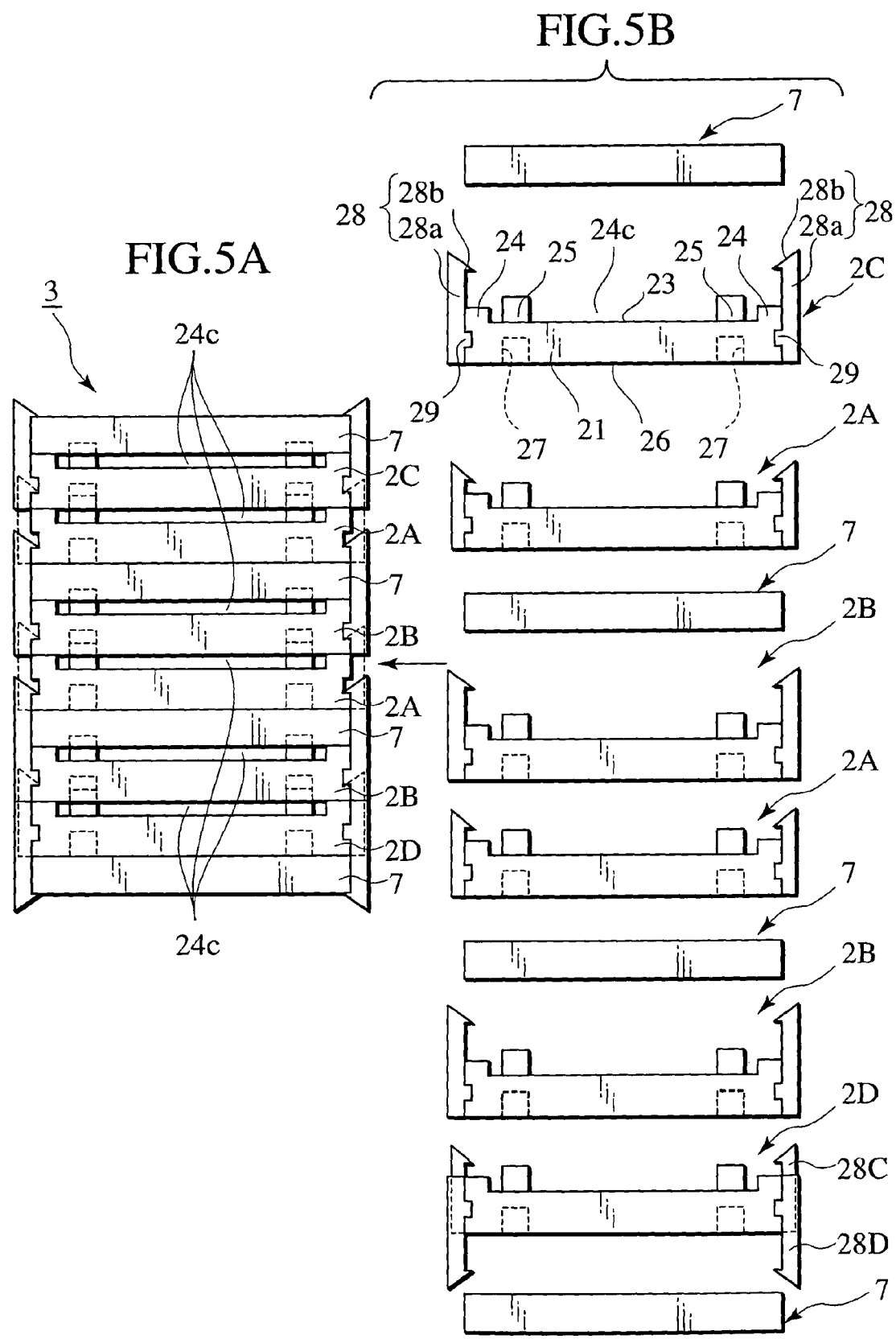

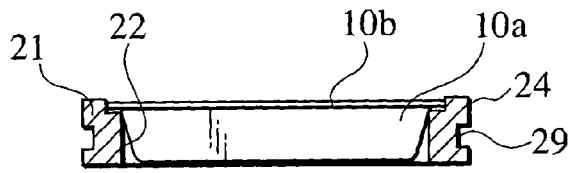
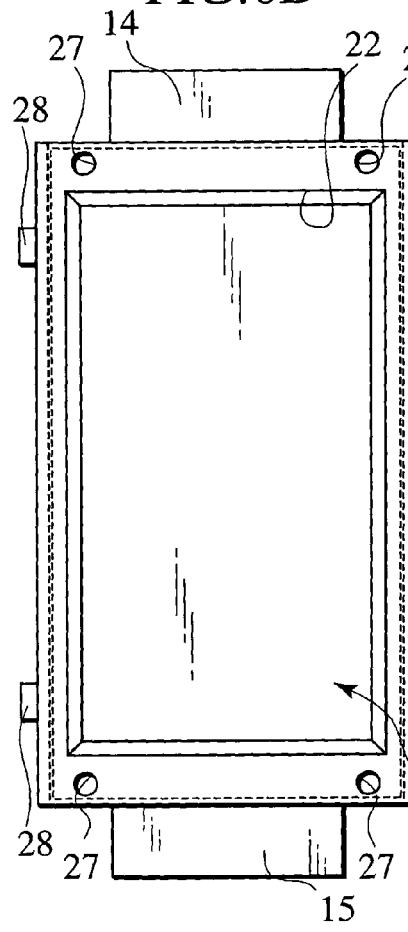
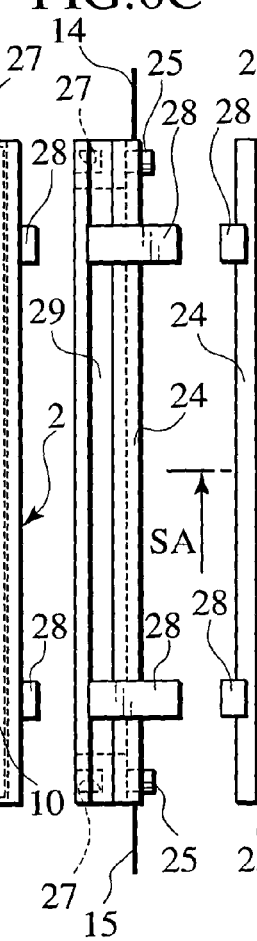
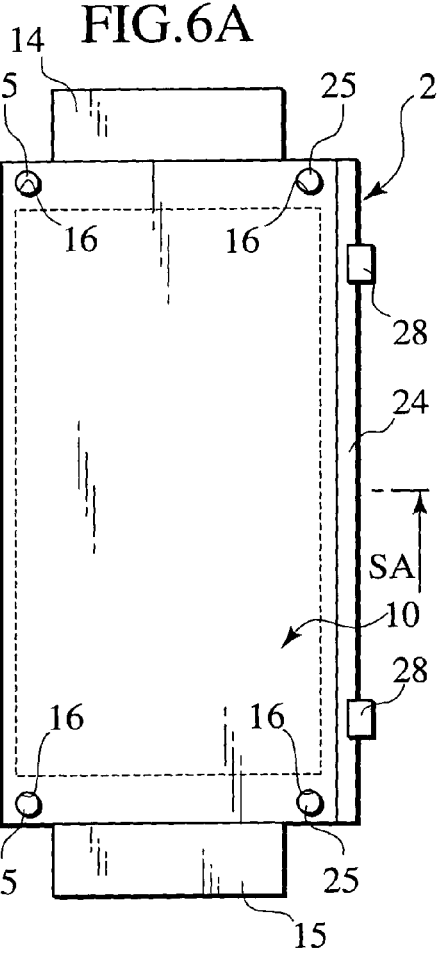
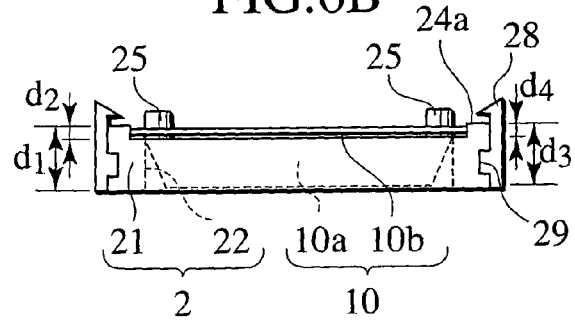

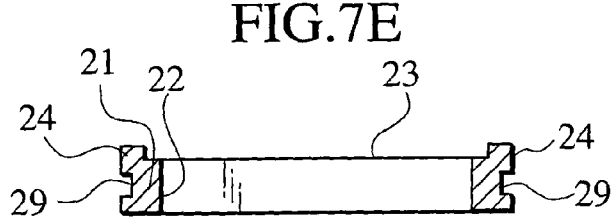
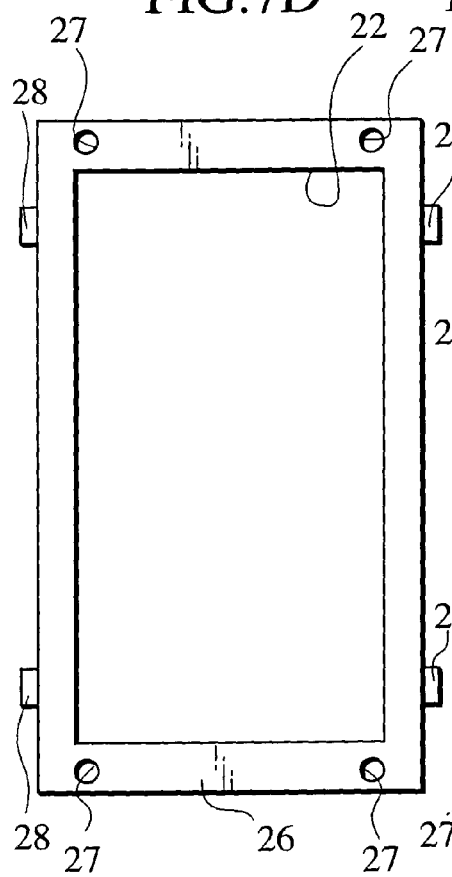
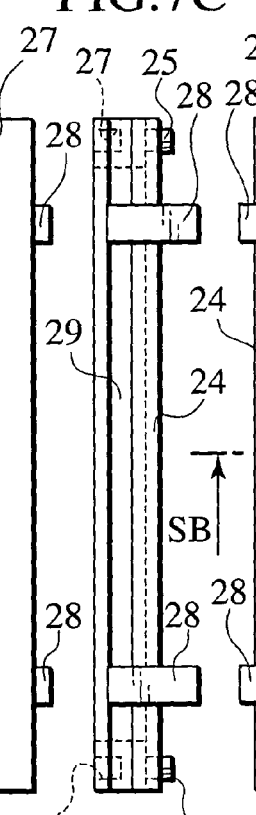
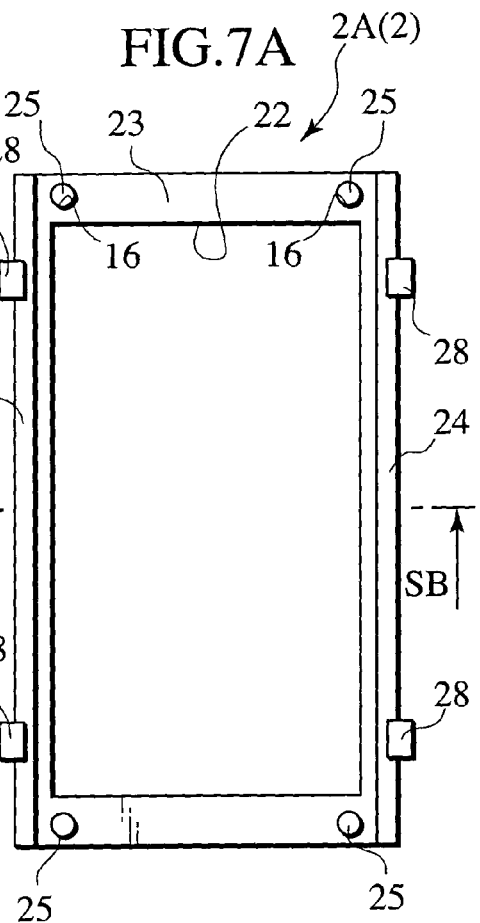
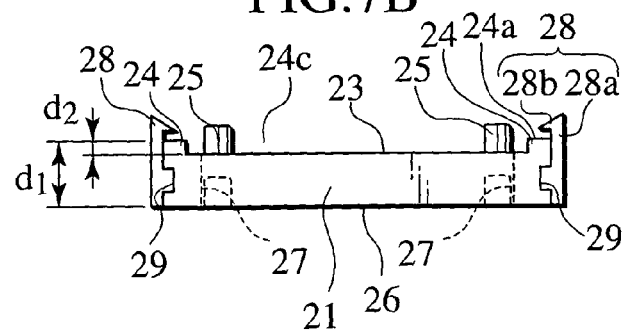

MODULE BATTERY

BACKGROUND OF THE INVENTION

1. Field of the Invention

The present invention relates to a module battery composed of a plurality of stack type cells having stacked electrodes, serving as an electric power generating element, which are hermetically sealed in package films.

2. Description of the Related Art

Recently, there has been increasing worldwide concern regarding air pollution caused by exhaust gases emitted from automobiles, and attention has been greatly focused on an electric vehicle propelled by a prime power source generating an electric power output, and a hybrid car combined with an engine and an electric motor. Research and development establishments working on such a high power output type battery for use in these vehicles are sharing important industrial positions.

Regarding such a high power output battery, a module battery has been developed that is comprised of a plurality of cells each with a high energy density and high power output, such as lithium ion batteries, which are combined in a large number of units.

In the related art, when combining large numbers of batteries to form a module battery, a structure has been proposed in which a large number of cells are stacked in a single row or in plural rows to allow respective cells and associated wirings to be connected to one another to form a sub-assembly body, which in turn is encapsulated in a module case (see Japanese Patent Application Laid-Open No. 2001-114157).

SUMMARY OF THE INVENTION

However, the use of the sub-assembly body formed by connecting large numbers of cells to the associated wirings in the manner mentioned above involves troublesome connection work for the respective cells and the associated electrode tabs, and troublesome connection work for the electrode tabs and the associated wirings. Especially, although a laminate cell (where both surfaces of the electric power generating element are sandwiched between a pair of package films, hermetically sealed to provide a light weight) is highly expected as the high power output battery for application to a vehicle installation, the laminate cell has a less rigidity. Hence, a great care is required to carry out the connection work for the respective cells and the associated electrodes tabs, and the connection work between the electrode tabs and the associated wirings.

Further, during assembly step of encapsulating the sub-assembly body into the module case as set forth above, it is highly probable that the sub-assembly body will be loosely fitted in the module case due to dimensional variations in the sub-assembly bodies. Specifically, this looseness of the stack battery in the module case causes the cells and connecting areas between the cell and the associated wirings to encounter excessive load, resulting in a shortened life cycle for the module battery.

Furthermore, when large numbers of cells are combined in the manner described above, adequate heat dissipation is required. In this case, ventilating atmospheric air into the module case results in undesirable consequences, such as motes of dust accumulating on the electrode terminals (a positive electrode terminal and a negative electrode terminal), resulting in the probability of short-circuits. Particularly, when using the module battery employing the cells forming the electric power generating element hermetically sealed with the package films, since the electrode terminals (the electrode tabs) are formed in strip shapes, the motes of dust tend to accumulate on the electrode terminals.

The present invention has been completed to address such issues encountered in the related art and has an object to provide a module battery which is easy to assemble; enabled to encapsulate a sub-assembly body in a module case with no looseness, and which is able to protect electrode tabs from motes of dust while providing effective heat dissipation.

According to one aspect of the present invention, there is provided a module battery, comprising: cells each having an electric power generating element hermetically sealed in a package film; and cell holders on each of which each of the cells is mounted and held, wherein the cell holders are formed in configurations so as to allow the cell holders to be freely stacked in a plurality of stages while permitting the cells to be retained thereon and to allow electrode tabs of the cells to be exposed between the cell holders neighboring in a stacking direction.

BRIEF DESCRIPTION OF THE DRAWINGS

The invention will now be described with reference to the accompanying drawings wherein;

FIG. 4 is an exploded view illustrating the module battery of the first embodiment according to the present invention;

FIG. 5A is a side view illustrating a stacked body of the module battery of the first embodiment according to the present invention;

FIG. 5B is an exploded view illustrating the stacked body of the module battery of the first embodiment according to the present invention;

FIG. 6A is a top view illustrating a cell holder of the module battery of the first embodiment according to the present invention under a condition in which a cell is mounted;

FIG. 6B is a side view illustrating the cell holder in which the cell is mounted;

FIG. 6C is a side view illustrating the cell holder in which the cell is mounted;

FIG. 6D is a rear view illustrating the cell holder in which the cell is mounted;

FIG. 6E is a cross sectional view taken on line SA—SA of FIG. 6A illustrating the cell holder in which the cell is mounted;

FIG. 7A is a top view illustrating the cell holder of the module battery of the first embodiment according to the present invention;

FIG. 7B is a side view illustrating the cell holder;

FIG. 7C is a side view illustrating the cell holder;

FIG. 7D is a rear view illustrating the cell holder;

FIG. 7E is a cross sectional view taken on line SB—SB of FIG. 7A illustrating the cell holder;

DETAILED DESCRIPTION OF THE PREFERRED EMBODIMENT

Figure 1:
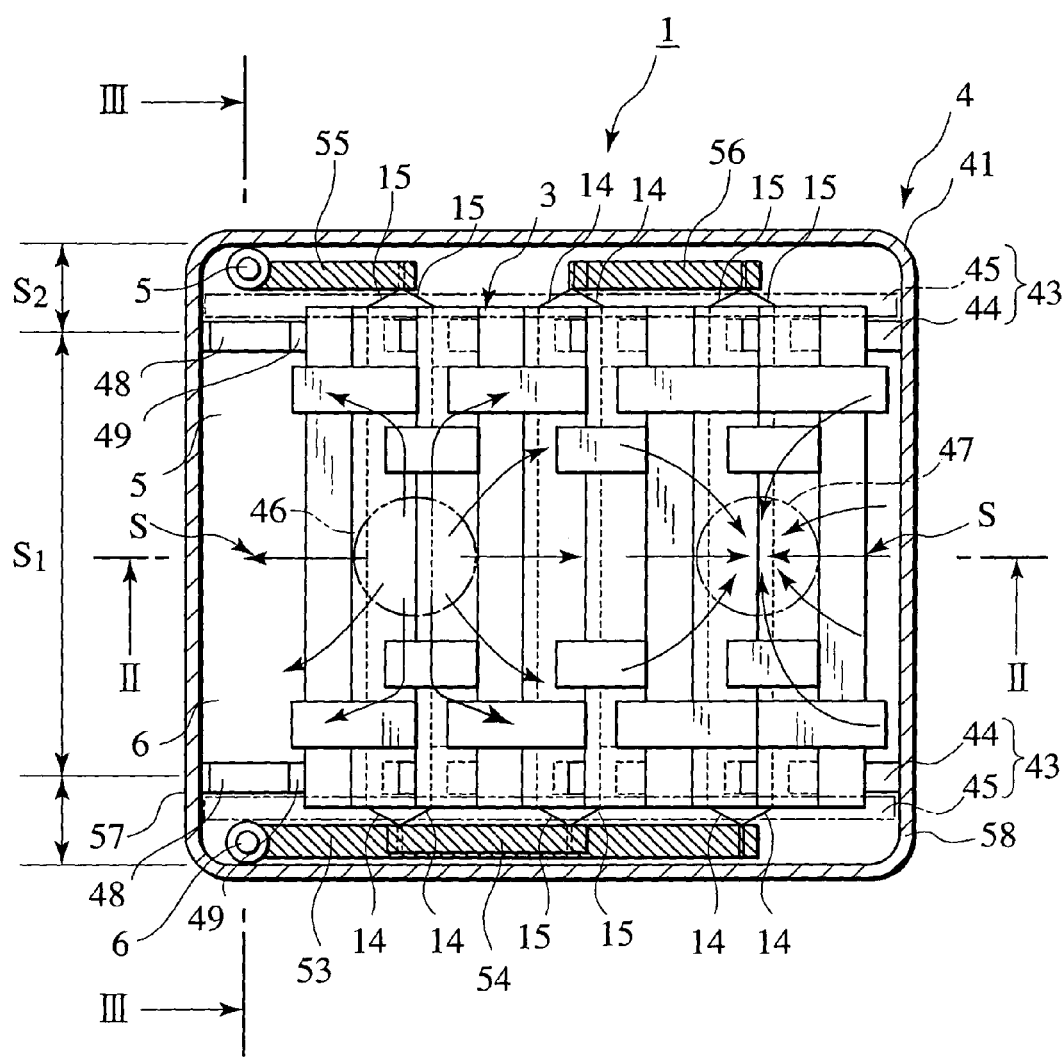
FIG. 1 is a cross sectional view illustrating a module battery of a first embodiment according to the present invention.

Hereinafter, description will be made of embodiments of the present invention with reference to the drawings.

First Embodiment

FIGS. 1 to 9 show a first embodiment of the present invention. As shown in FIGS. 1 to 4, a module battery 1 of the first embodiment is comprised of a basic structure constructed of a stacked body 3 (a sub-assembly body) formed in a multi-staged stack of cell holders 2 on each of which a cell 10 is mounted and held, and a module case 4 in which the stacked body 3 is encapsulated. A group of cells 10 inside the stacked body 3 are connected to input and output terminals 5, 6 in series and/or parallel through wirings 51, 52 and bus bars 53, 54, 55, 56, with charging and discharging cycles being performed via the input and output terminals 5, 6.

(Stacked Body)

As shown in FIGS. 1 to 4, the stacked body 3 has a basic structure constructed from the multi-staged stack of the cell holders 2 (see FIGS. 6A to 6E) on each of which the cell 10 is mounted and held. In the present embodiment, with a view to providing an improved heat dissipating property, plate-shaped heat sinks 7 are stacked in the uppermost stage and the lowermost stage, respectively, and a plate-shaped heat sink 7 is also intervened between given adjacent cell holders 2, 2. Hereinafter, the "cell" and the "cell holder" forming the stacked body 3 are described in detail, respectively.

(Cell)

Figure 8A:
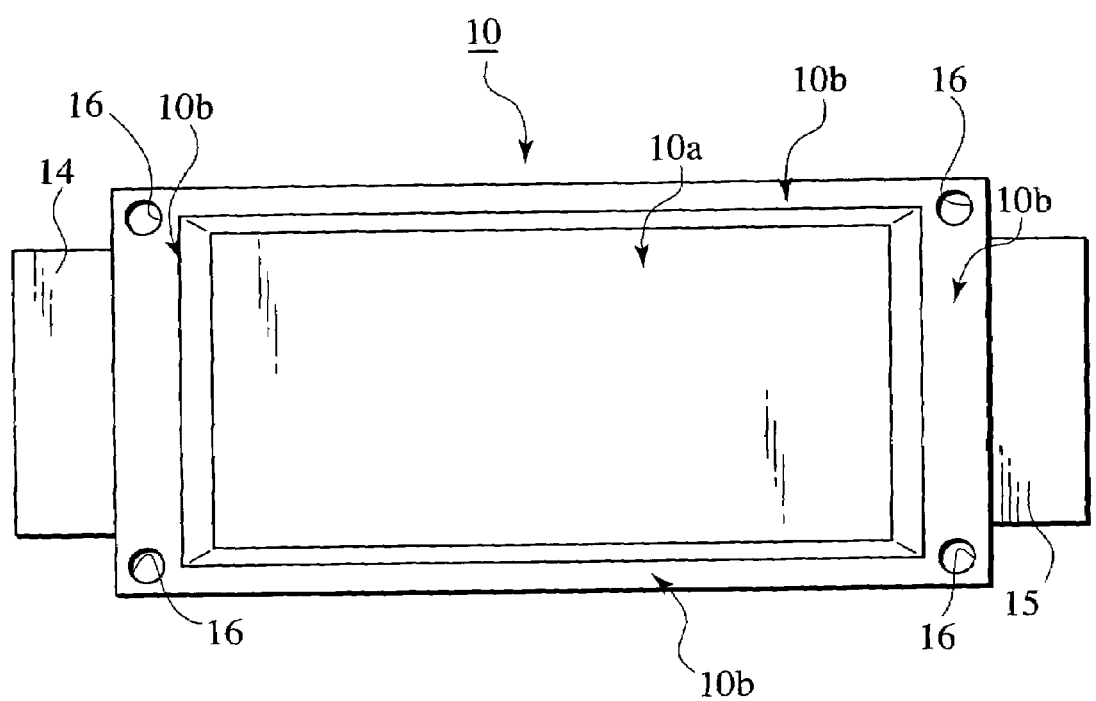
FIG. 8A is a top view illustrating the cell of the module battery of the first embodiment according to the present invention.
Figure 8B:
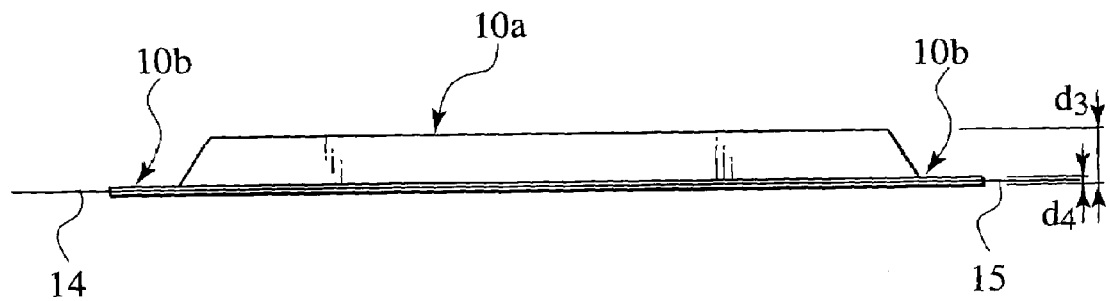
FIG. 8B is a side view illustrating the cell of the module battery.
Figure 9:
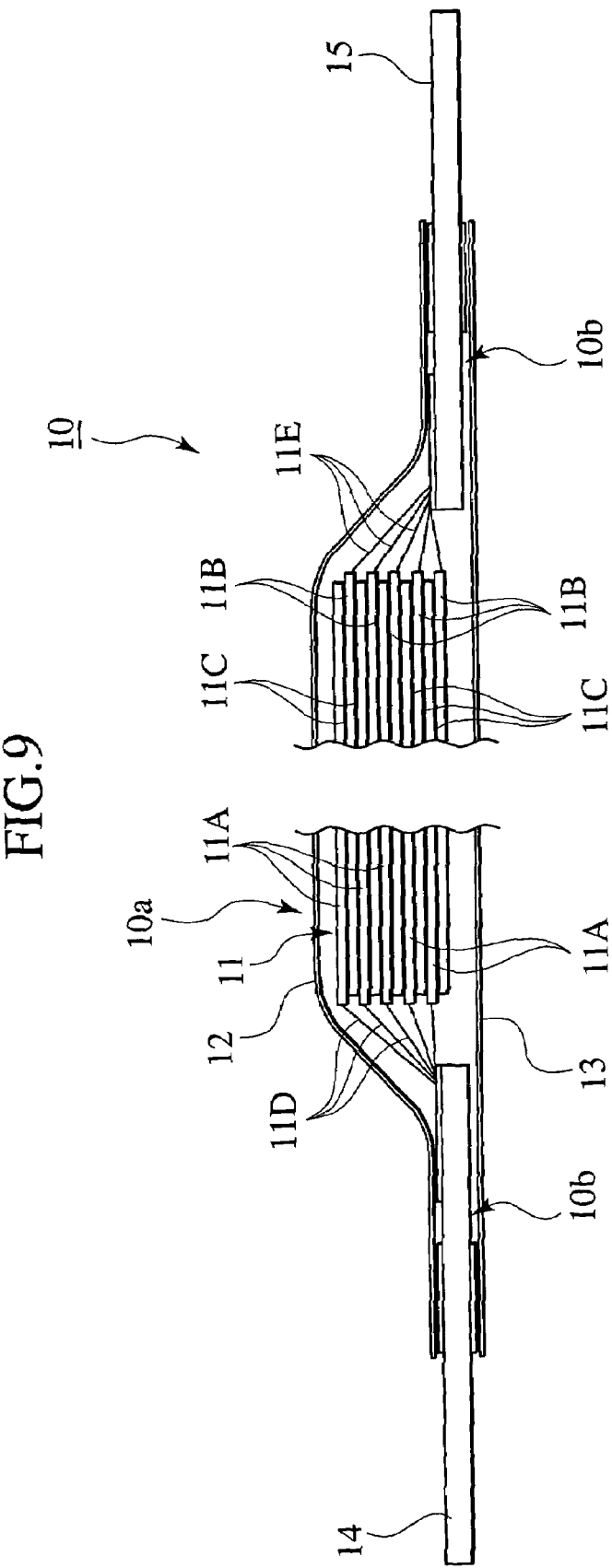
FIG. 9 is a schematic view illustrating an internal structure of the cell of the module battery.

As shown in FIGS. 8A, 8B and 9, the cell 10 includes an electric power generating element composed of flat-shaped stacked electrodes 11 which are centrally placed between a pair of laminate films 12, 13 serving as package films. These laminate films 12, 13 cover the top and bottom surfaces of the stacked electrodes 11, and sandwich the same, whereupon peripheral edge portions of these laminate films 12, 13 are thermally welded to allow electrolytes, together with the stacked electrodes 11, to be hermetically sealed between these laminate films 12, 13.

As such, the cell 10 has an externally appearing configuration with a thick portion 10$a$, formed in a cell central portion in an area where the stacked electrodes 11 are accommodated, and thin portions 10$b$ (joined portions 10$b$) formed in a cell peripheral edge at joined areas thereof.

The stacked electrodes 11 are comprised of a plurality of positive electrode plates 11A and a plurality of negative electrode plates 11B which are stacked in sequence with intervening separators 11C. Respective positive electrode plates 11A are connected to a positive electrode tab 14 via positive electrode leads 11D, and negative electrode plates 11B are connected to a negative electrode tab 15 via negative electrode leads 11E. The positive electrode tab 14 and the negative electrode tab 15 are extended to the outside of the joined portions 10$b$ of the laminate films 12, 13.

The positive electrode tab 14 and the negative electrode tab 15 are formed of metallic foils made from aluminum (Al), copper (Cu), nickel (Ni) and iron (Fe) and, in the present embodiment, the positive electrode tab 14 is formed of Al while the negative electrode tab 15 is formed of Ni. In addition, each of the laminate films 12 and 13 is composed of a nylon layer $\alpha$ as a resin layer, an adhesive layer $\beta$, an aluminum foil layer $\gamma$ as a metallic layer, and a polyethylene or polypropylene layer $\delta$ as a resin layer in order from the outside to the inside (see FIG. 15).

(Raw Materials of Cell)

The module battery 1 of the present embodiment has an on-vehicle application and includes a battery employing a lithium ion secondary battery with a high energy density and high power output. Hereinafter, the materials of the lithium ion battery are additionally explained.

As a positive electrode active material forming the positive electrode plate 11A, a compound is contained that includes lithium nickel composite oxides, in particular, compounds expressed by a general formula $LiNi_{1-x}M_xO_2$. Here, x lies in a range of $0.01 \leq x \leq 0.5$, and M represents at least one element selected from iron (Fe), cobalt (Co), manganese (Mn), copper (Cu), zinc (Zn), aluminum (Al), tin (Sn), boron (B), gallium (Ga), chromium (Cr), vanadium (V), titanium (Ti), magnesium (Mg), calcium (Ca) and strontium (Sr).

Further, the positive electrode may contain other positive electrode active material than the lithium nickel composite oxides. This material may include lithium manganese composite oxides that form compounds expressed by a general formula $Li_yMn_{2-z}M'_zO_4$. Here, y lies in a range of $0.9 \leq y \leq 1.2$ while z lies in a range of $0.01 \leq z \leq 0.5$, and M' represents at least one element selected from Fe, Co, Ni, Cu, Zn, Al, Sn, B, Ga, Cr, V, Ti, Mg, Ca and Sr. Alternately, this material may include lithium cobalt composite oxides that form compounds expressed by a general formula $LiCo_{1-x}M''_xO_2$. Here, a range of x lies in $0.01 \leq x \leq 0.5$, and M'' represents at least one element selected from Fe, Ni, Mn, Cu, Zn, Al, Sn, B, Ga, Cr, V, Ti, Mg, Ca and Sr.

Although there are no particular limitations in the manufacturing methods of the lithium nickel composite oxides, the lithium manganese composite oxides and the lithium cobalt composite oxides, these compounds may be obtained by mixing carbonates such as lithium, nickel, manganese and cobalt at ratios depending on constituents thereof and baking these carbonates in a temperature ranging from 600° C. to 1000° C. Also, the starting materials may not be limited to the carbonates and can also be similarly synthesized from hydroxides, oxides, nitrates and organic acid salts.

Also, the positive electrode material such as the lithium nickel composite oxides and the lithium manganese composite oxides may preferably have an average particle size of 30 µm or below.

Further, the negative electrode plate 11B is formed of the negative electrode active material with a specific surface area in a range from 0.05 m$^2$/g to 2 m$^2$/g. As a result of the negative electrode material with the specific surface area of the above range, it is possible to adequately restrict an excessive amount of a solid electrolyte interface layer (SEI layer) from being formed on the negative electrode surface.

With the negative electrode active material having a specific surface area of less than 0.05 m$^2$/g, since an area available for lithium ions to transfer is extremely small, the lithium ions doped into the negative electrode active material during the charging cycle become too hard to be sufficiently doped out from the negative electrode active material during the discharging cycle, resulting in deterioration in the charging and discharging efficiency. Conversely, with the negative electrode active material having a specific surface area of greater than 2 m$^2$/g, it is difficult to control an excessive amount of the SEI layer from being formed on the negative electrode surface.

The negative electrode active material may include any material that allows the lithium ions to be doped into or out of the material at a voltage versus lithium of less than 2.0 volts. More particularly, carbonaceous materials may be used which involve a non-graphitizable carbon material, artificial graphite, natural graphite, pyrolytic graphite, cokes including pitch coke, needle coke and petroleum coke, graphite, glassy carbon, a sintered material of polymers formed by baking and carbonizing phenol resin or furan resin at an appropriate temperature, carbon fiber, activated carbon and carbon black.

Further, a metal, that is able to form an alloy with lithium, and an alloy thereof can also be used and, in particular, these materials include oxide products or nitride products, that allow the lithium ions to be doped into or out of the material at a relatively low voltage potential, such as iron oxide, ruthenium oxide, molybdenum oxide, tungsten oxide, tin oxide and main group elements of group 13. In addition thereto, these materials include elements such as silicon (Si) and tin (Sn), or alloys of Si and Sn represented by a formula $M_x Si$ and $M_x Sn$ (wherein M represents more than one metallic element except for Si or Sn). Among these, it is particularly preferable for Si or the Si alloys to be used.

Further, the electrolyte may include a liquid state, a so-called electrolysis solution composed of electrolyte salts dissolved in and adjusted in a non-aqueous solvent, polymer gel electrolyte composed of the electrolyte salt dissolved in the non-aqueous solvent which is retained in a polymer matrix, and polymer electrolyte composed of the electrolyte salt dissolved in the polymer.

When using the polymer gel electrolyte as the non-aqueous electrolyte, the polymer to be used includes poly (vinylidene fluoride) and polyacrylonitrile. Also, when using the polymer electrolyte, a polymer of polyethylene oxide (PEO) may be used.

The non-aqueous solvent may include any kind of solvent if it remains in a non-aqueous solvent heretofore used in a secondary battery using such kinds of non-aqueous electrolyte. As the non-aqueous solvent, propylene carbonate, ethylene carbonate, 1,2-dimethoxyethane, diethyl carbonate, dimethyl carbonate, γ-butyrolactone, tetrahydrofuran, 1,3-dioxolane, 4-methyl-1,3-dioxolane, diethylether, sulfolane, methyl sulfolane, acetonitrile and propionitrile can be used. Also, these non-aqueous solvents may be used as a single kind or in a mixture of more than two kinds.

Particularly, the non-aqueous solvent may preferably contain an unsaturated carbonate. More particularly, it is more preferable for the non-aqueous solvent to contain vinylene carbonate. The presence of the unsaturated carbonate contained as the non-aqueous solvent enables an effect, derived in the negative electrode active material from the property (a function of a protective layer) of the SEI layer, to be obtained and it is conceivable that an excessive discharging-resistant characteristic is further improved.

Further, the unsaturated carbonate may be preferably contained in the electrolyte in a range from 0.05 wt % to 5 wt % and, more preferably, in a range from 0.5 wt % to 3 wt %. With the amount of content of the unsaturated carbonate being weighed in the above range, a non-aqueous secondary battery is provided which has a high initial discharging capacity with a high energy density.

The electrolyte salt may not be limited to a particular composition provided that it forms a lithium salt presenting an ion conductivity and may include $LiClO_4$, $LiAsF_6$, $LiPF_6$, $LiBF_4$, $LiB(C_6H_5)_4$, LiCl, LiBr, $CH_3SO_3Li$ and $CF_3SO_3Li$. The electrolyte salt may be used as a single kind or may be possibly used in a mixture of more than two kinds.

The use of such a lithium ion secondary battery provides the module battery, of the present embodiment, with a structure suited for use in an on-vehicle application.

(Cell Holder)

As shown in FIGS. 5A to 7, the cell holders 2 are constructed to provide capabilities of permitting the cells 10 to be placed and retained in fixed places while being available to be freely stacked in a plurality of stages. The cell holder 2 has a frame section 21 on which the thin portions 10b of the cell 10 are mounted, and an opening portion 22 adapted to accommodate the thick portion 10a of the cell 10, so that the cell holder 2 is formed in a frame shape.

Vertical walls 24 are formed on the frame section 21 of the cell 10 at an outer periphery of a mounting surface 23, on which the thin portions 10b of the cell 10 are mounted. The vertical walls 24 protrude in a direction in which the cell holders 2 are stacked. The height d2 of the vertical wall 24 is set so as to be equal to a thickness d4 or to be higher than the thickness d4 of the thin portion 10b of the cell 10. A distal end surface 24a of the vertical wall 24 is adapted to be brought into abutting engagement with a rear surface of another adjacent cell holder 2. As a result, when stacking the cell holders 2, the cell 10 is not pressured and even if the cell 10 is pressured, the probability of excessive pressure does not exist.

Additionally, notched portions 24c that allow the electrode tabs 14, 15 to be exposed are formed near the vertical walls 24 of the frame section 21 at both longitudinal ends of the cell holder 2. Due to such a configuration, when the plural cell holders 2 are stacked in a plurality of stages, the cells 10 are retained in spaces between the cell holders 2, 2 neighboring in the stacking direction, and the electrode tabs 14, 15 of the cell 10 are exposed from between the adjacent cell holders 2, 2. For this reason, it is possible to perform connection work for mutually connecting the electrode tabs 14, 15 and a connection work for connecting the wirings 51, 52 and bus bars 53 to 56 without concern for the rigidity of the cell 10. As shown in FIG. 6, in the present embodiment, the thickness d1 of the cell holder 2 is determined so as to be substantially equal to the thickness d3 of the cell 10, thereby making it possible for the thickness d1 of the cell holder 2 to be minimized. As a result, this contributes to the miniaturization of the whole of the module battery 1.

Locate pins 25 are formed at four corners of the mounting surface 23 of the frame section 21. The locate pins 25 protrude in a direction in which the cell holders 2 are stacked, and are fitted to through-bores 16 formed in joined portions 10b of the cell 10 to allow the cell 10 to be positioned in the cell holder 2.

Further, a rear surface 26 of the cell holder 2 is formed with locate holes 27 at positions corresponding to the locate pins 25. For this reason, when the cell holders 2 are stacked, the locate pins 25 of the cell holder 2 located at a lower side in the stacking direction are brought into engagement with the locate holes 27 of the cell holder 2 located at an upper side in the stacking direction, enabling the cell holders 2 to be stacked in multiple stages with no deviations.

Each of the cell holders 2 is formed with couplings 28 each of which includes a flexible arm 28a with its tip formed with a hook 28b, by which the plural cell holders 2 are enabled to be connectively fixed in place. The present embodiment includes four types of cell holders 2 (as represented by 2A, 2B, 2C, 2D), as shown in FIG. 5, with a difference in structures of respective couplings 28. Hereinafter, the cell holders 2 (2A, 2B, 2C, 2D) are described with reference to FIG. 5.

The cell holder 2A is of a type which allows the cell holder 2 to be connected and fixed so as to be directly stacked upward. The couplings 28 of the cell holder 2A have flexible arms 28a each with a height determined so as to allow the hook 28b to engage with each of outer peripheral recesses 29 of the frame section 21 of the adjacent cell holder 2 located at the upper side in the stacking direction.

The cell holder 2B is of a type which allows the cell holder 2 to be directly stacked upward under a condition where the heat sink 7 is intervened. The couplings 28 of the cell holder 2B have flexible arms 28a each with a height determined so as to allow the hook 28b to engage with each of outer peripheral recesses 29 of the frame section 21 of the cell holder 2 neighboring via the intervening heat sink 7 so as to locate at the upper side.

The cell holder 2C is of a type which allows the heat sink 7 to be connected and fixed at an upper side. The couplings 28 of the cell holder 2C have flexible arms 28a each with a height determined so as to allow the hook 28b to engage with an angled portion of a surface periphery of the upper heat sink 7.

The cell holder 2D is of a type which allows the cell holder 2 to be connected and fixed so as to be directly stacked upward while enabling the heat sink 7 to be connected and fixed at a lower side, and includes two kinds of couplings 28C, 28D. The couplings 28C have flexible arms 28a each with a height determined so as to allow the hook 28b to engage with each of outer peripheral recesses 29 of the frame section 21 of the adjacent cell holder 2 located at the upper side in the stacking direction, and the couplings 28D have flexible arms 28a each with a height determined so as to allow the hook 28b to engage with an angled portion of a rear surface periphery of the lower heat sink 7.

Figure 10:
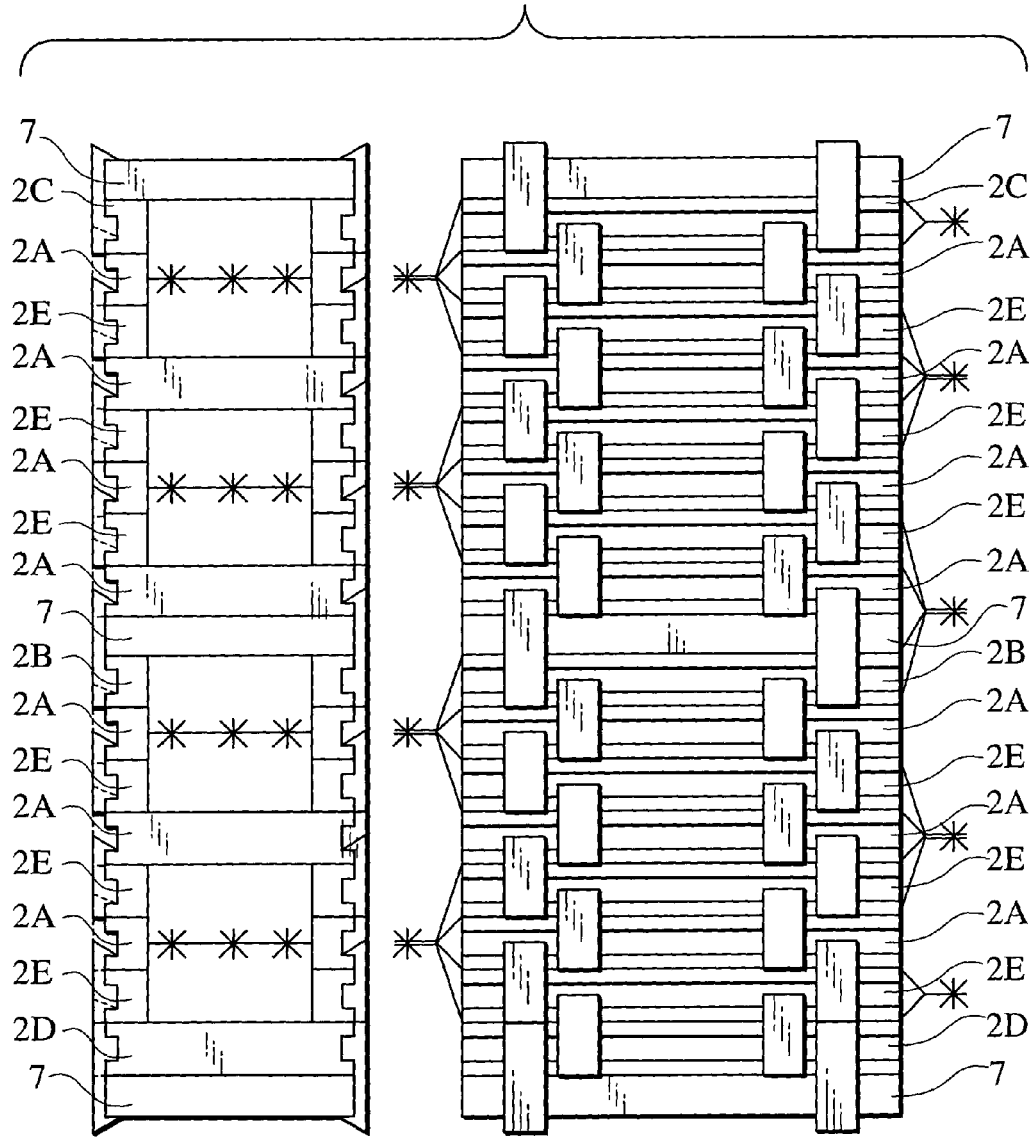
FIG. 10 is a view illustrating another example of a stacked body of the module battery of the present invention.

Further, in the present embodiment, although the stacked body 3 is constructed using the four types of cell holders 2 (2A, 2B, 2C, 2D), the number of cells combined in the stacked body may be altered by additionally providing a cell holder 2E that is structured so as to be identical in structure with the cell holder 2A and has a configuration so as to avoid an interference with the coupling positions of the cell holder 2A (see FIG. 10).

(Module Case)

Figure 2:
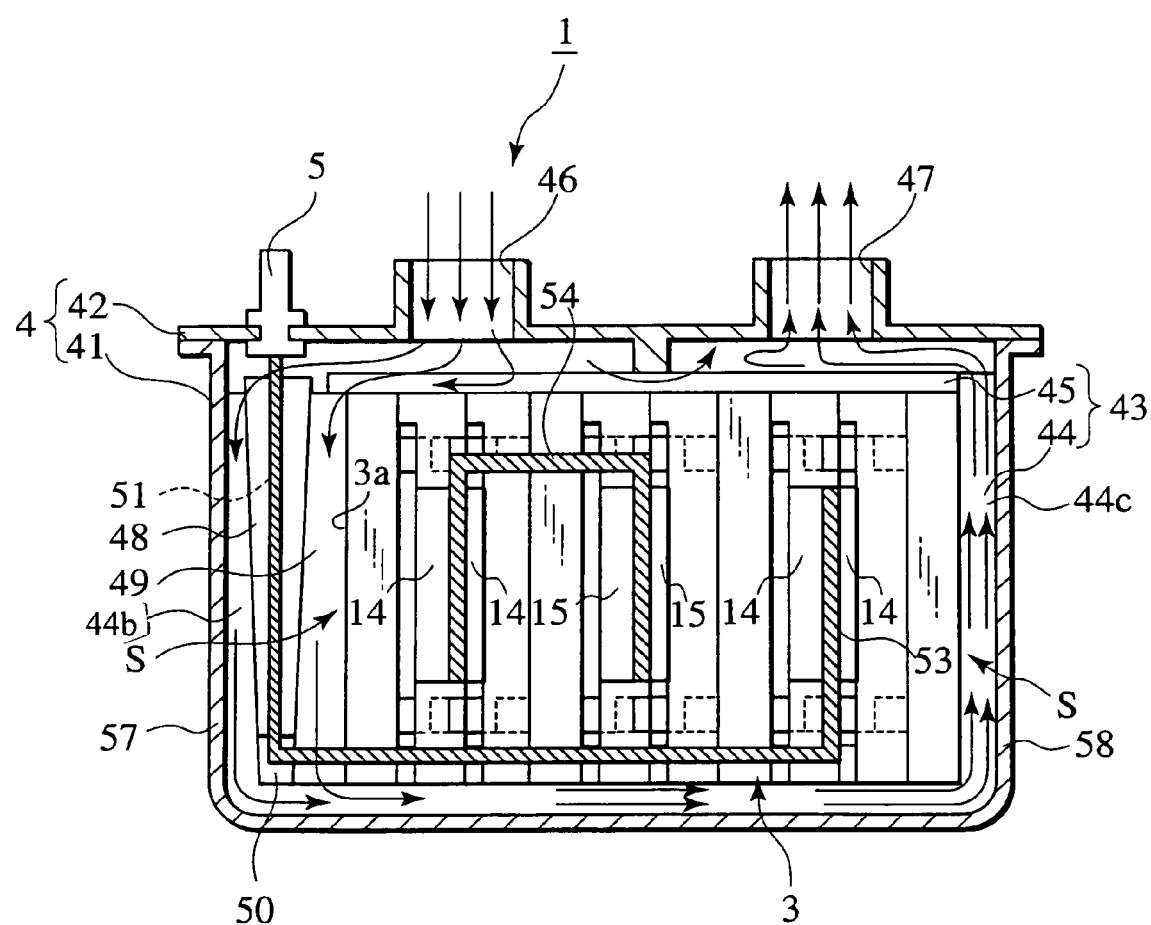
FIG. 2 is a cross sectional view taken on line II—II of FIG. 1.
Figure 3:
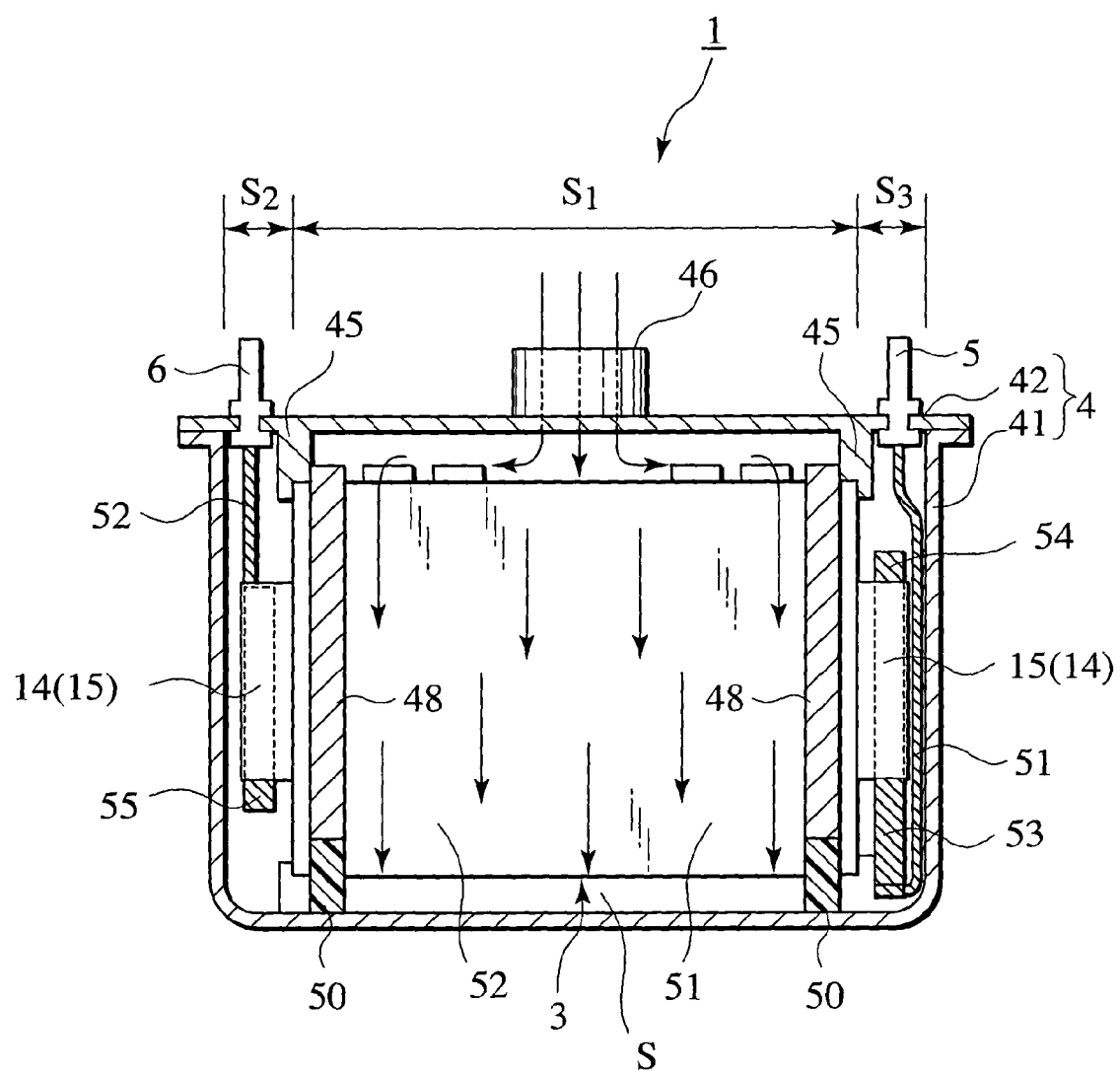
FIG. 3 is a cross sectional view taken on line III—III of FIG. 1.

As shown in FIGS. 1 to 4, the module case 4 is comprised of a case body 41 formed in a container shape, and a lid member 42 that serves to allow an upper opening of the case body 41 to be hermetically sealed, thereby encapsulating the stacked body 3. At an internal surface of the module case 4, a pair of ribs 43, 43 protrude so as to extend over the internal surface of the module case 4, with a space S being defined by these ribs 43, 43 between the stacked body 3 and the internal surface of the module case 4. As shown in FIGS. 2 and 4, also, the rib 43 is comprised of a rib component 44 formed on the case body 44, and a rib component 45 formed on the lid member 42.

Additionally, the lid member 42 is formed with a air inlet 46 and a air outlet 47 to allow an atmospheric air stream, drawn from the air inlet 46 into the space S, to be exhausted from the air outlet 47, thereby enabling the heat of the cell group inside the stacked body 3 to be dissipated.

Here, in the present embodiment, the stacked body 3 takes the form of a fully closed cross sectional structure except for both ends in longitudinal directions of the cell holders 2 at areas where the notched portions 24c are located, and the space S is defined by the rib components 44, 45, wedge-shaped spacers 48, 49 and a seal member 50. More particularly, the space S is defined by separating walls composed of the rib components 44, 45, the wedge-shaped spacers 48, 49 and the seal member 50 into a ventilation space S1, which is in communication with the exterior of the module case 4 via the air inlet 46 and the air outlet 47 set forth above, and electrode tab exposure spaces S2, S3 that allow the electrode tabs 14, 15 to be exposed.

That is, since the electrode tab exposure spaces S2, S3 form the spaces in which connected areas of the electrode tabs 14, 15, and connected areas between the electrode tabs 14, 15 and the wirings 51, 52 and the bus bars 53 to 56, it is necessary to avoid the entry of motes of dust that adversely affect electrical contact. However, in the present embodiment, since the electrode tab exposure spaces S2, S3 are separate from the ventilation space S1, it is possible to prevent the electrode tabs 14, 15 from accumulating motes of dust, while efficiently dissipating the heat built up in the cells 10 inside the stacked body 3.

(Wedge-Shaped Spacer)

Here, in the present embodiment, wedge-shaped spacers 48, 49 are disposed in the module case 4 so as to allow the stacked body 3 to be encapsulated with no looseness. As shown in FIGS. 2 and 4, the wedge-shaped spacers 48, 49 are disposed between one of opposing side wall portions 57, 58 of the case body 41, and one terminal end 3a, facing in the stacking direction, of the stacked body 3. As such, the stacked body 3 is deviated toward the other side wall portion 58, thereby permitting the stacked body 3 to be accommodated in the module case 4 with no looseness.

More specially, the wedge-shaped spacers 48, 49 are placed between a vertically orientated portion 44b (i.e., an area which is formed on the side wall portion 57 of the rib component 44), of the rib component 44, and the stacked body 3, causing the stacked body 3 to be deviated toward the other vertically orientated portion 44c (i.e., an area which is formed on the side wall portion 58 of the rib component 44) of the rib component 44.

(Assembly Process)

The module battery 1 thus structured is assembled in the following manner.

First, as shown in FIGS. 6A to 6E, one cell 10 is placed on and retained by one cell holder. In this instance, fitting the through-bores 16 of the cell 10 to the locate pins 25 of the cell holder 2 allows the cell 10 to be positioned on and retained by the cell holder 2.

Next, as shown in FIGS. 5A and 5B, the cell holder 2, on which the cell 10 is mounted and held, and the heat sink 7 are connected and fixed to one another in a given sequence, thereby forming the stacked body 3. The cell 10 is omitted in FIGS. 5A and 5B.

Subsequently, the electrode tabs 14, 15 of the cell 10 exposed from the stacked body 3 are connected to the input and output terminals 5, 6 fixed to the lid member 42 in series and/or parallel via the wirings 51, 52 and the bus bars 53 to 56, thereby forming a power circuit. When this takes place, since the cell 10 is retained by the cell holder 2 forming the stacked body 3, it becomes possible to perform the connection work for the electrode tabs 14, 15 and the connection work between the electrode tabs 14, 15, the wirings 51, 52 and the bus bars 53 to 56 without concern for the a weakness of the cell 10.

Next, as shown in FIG. 4, the stacked body 3, in which the wirings 51, 52 and the bus bars 53 to 56 have been connected, is accommodated in the case body 41. Fitting the pair of wedge-shaped spacers 48, 49 between the stacked body 3 and the rib component 43 of the case body 41 allows the stacked body 3 to be fitted in the case body 41 with no looseness.

Finally, the lid member 42 is placed over the upper opening of the case body 41 and joined thereto, providing the desired module battery 1.

The module battery 1 thus structured has the following advantageous effects.

Since the module battery 1 is structured to allow the cell holders 2, on which the cells 10 are mounted and held, to be freely stacked in plural stages, the cell holders 2 can be stacked in plural stages and it is possible to perform the connection work for the electrode tabs 14, 15 of the cells 10 and the connection work for the electrode tabs 14, 15, the wirings 51, 52 and the bus bars 53 to 56 without concern for the weaknesses of the cells 10. Also, since the electrode tabs 14, 15 are exposed, no connection work is required to connect the electrode tabs 14, 15, the wirings 51, 52 and the bus bars 53 to 56 prior to overlapping the cell holders 10. That is, under a condition where the plurality of cell holders 2 have been stacked, assembly works can easily occur for connecting the electrode tabs 14, 15 of the cells 10 and connecting the electrode tabs 14, 15, the wirings 51, 52 and the bus bars 53 to 56. Thus, the module battery 1 can be formed by easy assembly work.

The presence of the wedge-shaped spacers 48, 49 fitted between the stacked body 3, formed in the sub-assembly body, and the side wall portion 57 of the module case 4 allows the looseness in clearance between the stacked body 3 and the side wall portion 57 to be absorbed. This enables the stacked body 3 to be accommodated in the module case 4 with no looseness. Also, since the wedge-shaped spacers 48, 49 are fitted between the terminal end 3a of the stacked body 3 and the side wall portion 57 of the module case 4, the cell holders 2 (including the heat sinks 7) forming the stacked body 3 can be mutually kept in close contact with one another. Additionally, when altering the number of cell holders 2 to be accommodated in the module case 4, altering the number of the wedge-shaped spacers 48, 49 to be overlapped in the stacking direction enables the stacked body 3 to be encapsulated with no looseness. Thus, a large number of the same component parts share other component parts to enable deployment in variations of the stacked body 3, resulting in an advantageous reduction in cost.

Since the space S formed between the stacked body 3 and the module case 4 is divided into the ventilation space S1 and the electrode tab exposure spaces (non-ventilation spaces) S2, S3 by the partition walls (44, 45, 48, 49 and 50), favorable heat dissipating performance is exhibited while protecting the electrode tabs 14, 15 of the cells 10 from motes of dust.

Since the cell holder 2 has the locate pins 25, and the cell 10 is formed with the through-bores 16 through which the locate pins 25 of the cell holder 2 extend, the cell 10 can be easily positioned and, in addition, the assembly work of the module battery 1 can be easily completed. Further, since the cells 10 are retained by the respective cell holders 2 with no looseness, the module battery 1 has an improved handling capability.

Since the cell holders 2 neighboring to one another in the stacking direction are structured so as to be mutually and freely connected, it becomes extremely easy to assemble the stacked body 3 in which the cell holders 2 are stacked in the plural stages. As a result, the assembly work of the module battery 1 can be further enhanced.

Figure 11:
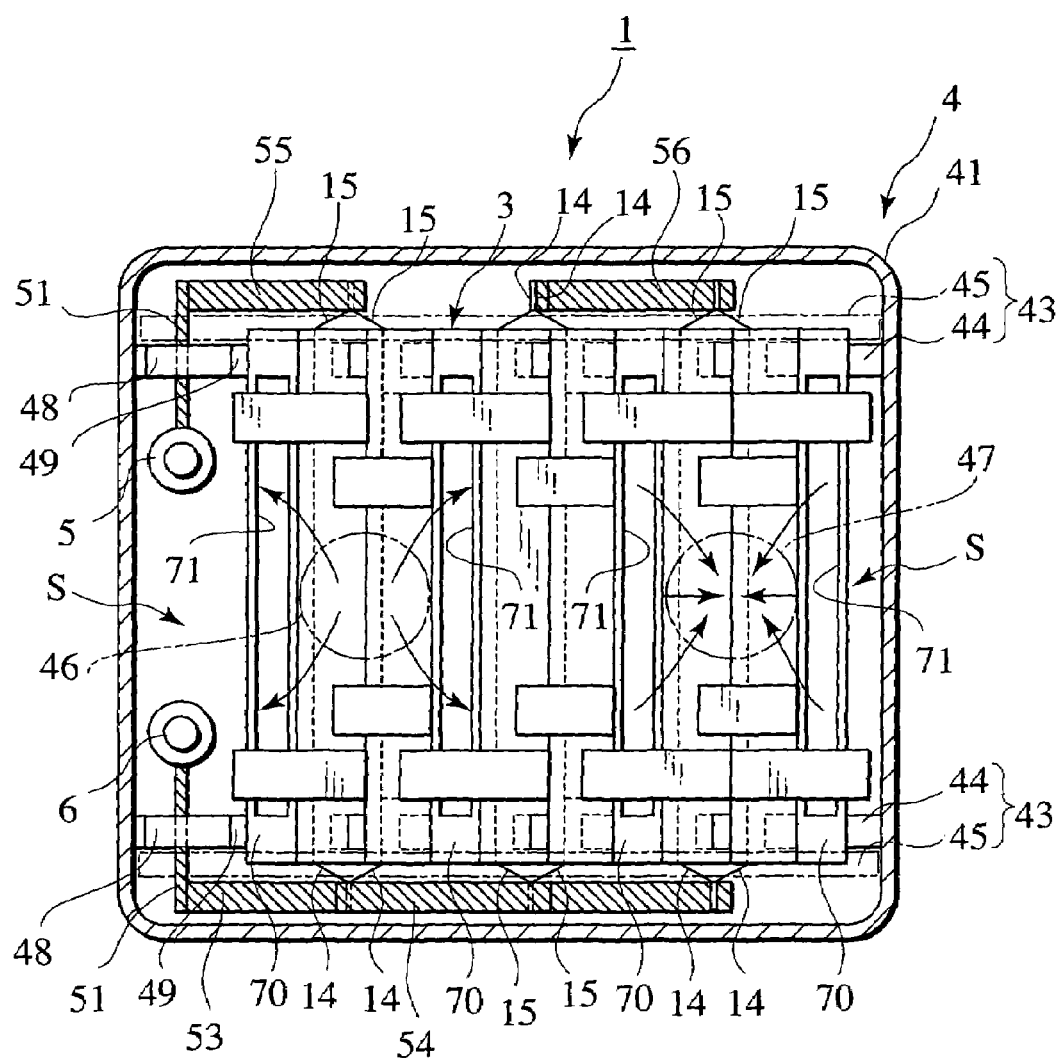
FIG. 11 is a cross sectional view illustrating a modified form of the module battery of the first embodiment according to the present invention.
Figure 12:
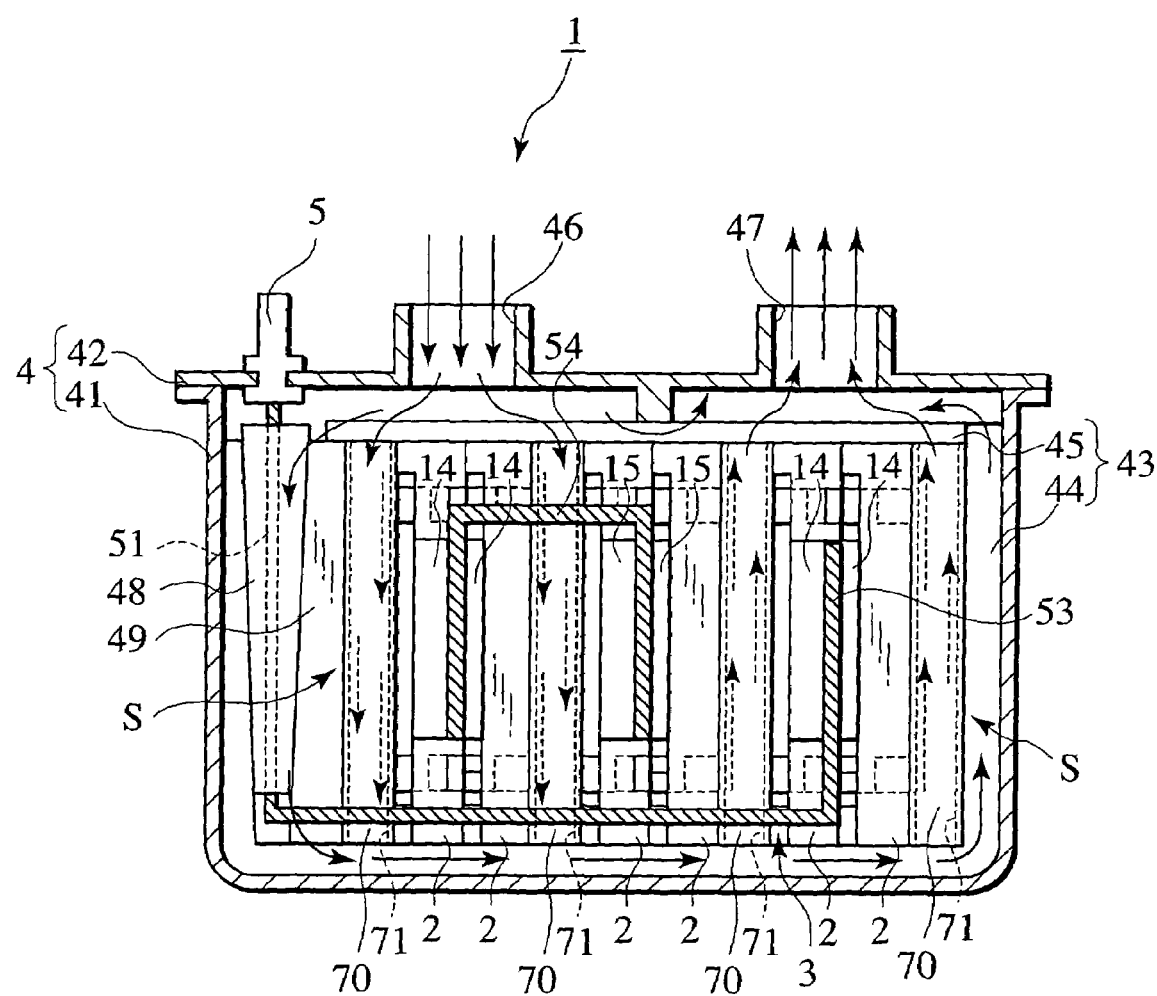
FIG. 12 is a side view illustrating the modified form of the module battery of the first embodiment according to the present invention.
Figure 13:
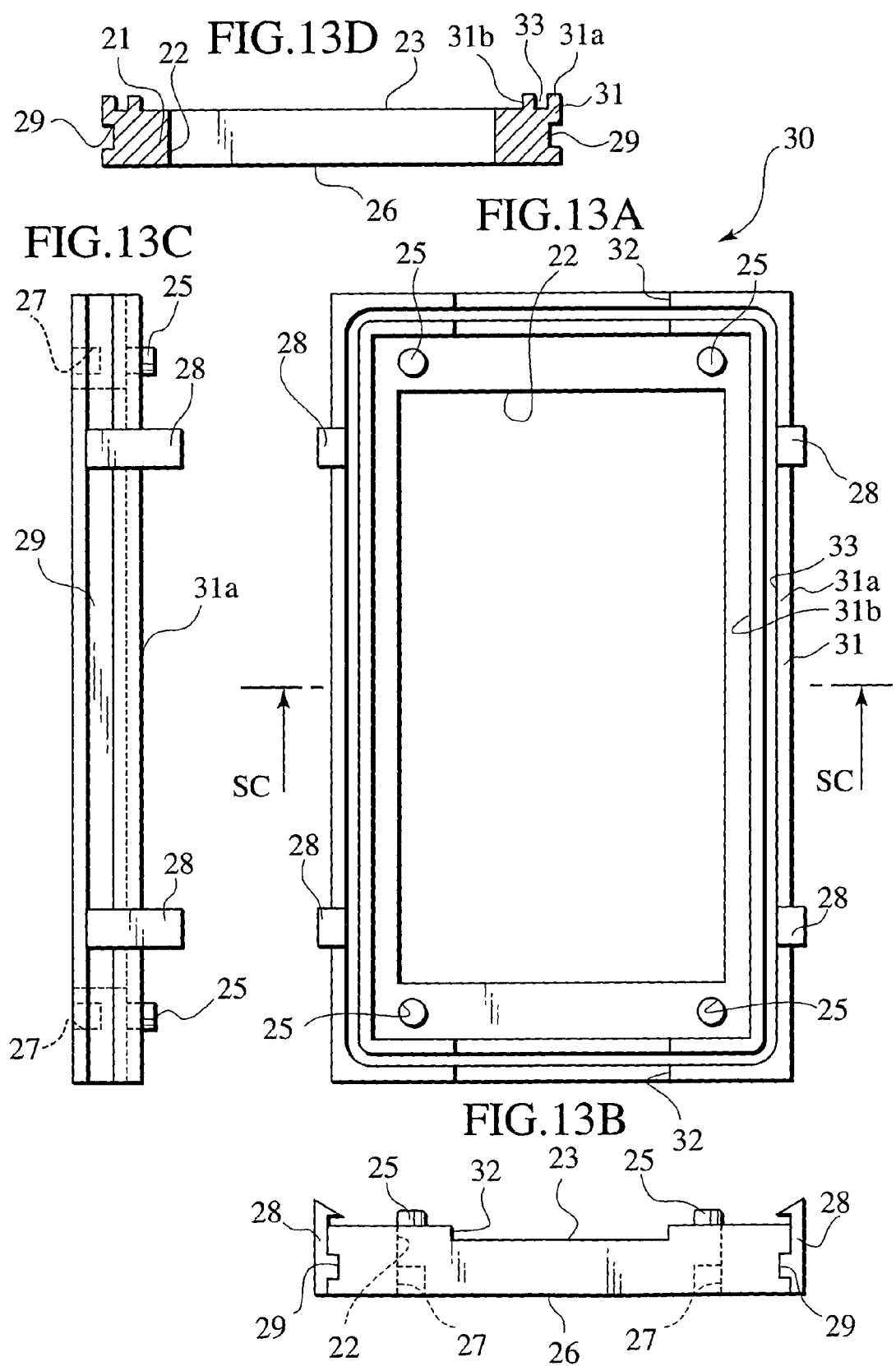
FIG. 13A is a top view illustrating a cell holder of a module battery of a second embodiment according to the present invention.
FIG. 13B is a side view illustrating the cell holder of FIG. 13A.
FIG. 13C is a side view illustrating the cell holder of FIG. 13A.
FIG. 13D is a cross sectional view taken on line SC—SC of FIG. 13A illustrating the cell holder shown in FIG. 13A.

Since the plate-shaped heat sink 7 is intervened between the cell holders 2 neighboring one another in the stacking direction, the stacked body 3 can be effectively heat dissipated. Also, as shown in FIGS. 11 and 12, if the heat sink 70 is configured to have a hollow shape, a hollow portion 71 of the heat sink 70 forms a flow passage, resulting in formation of the module battery 1 has even better a heat dissipating properties.

Second Embodiment

FIGS. 13A to 15 show a second embodiment. The same component parts as those of the first embodiment bear the same reference numerals to omit redundant description.

Figure 14:
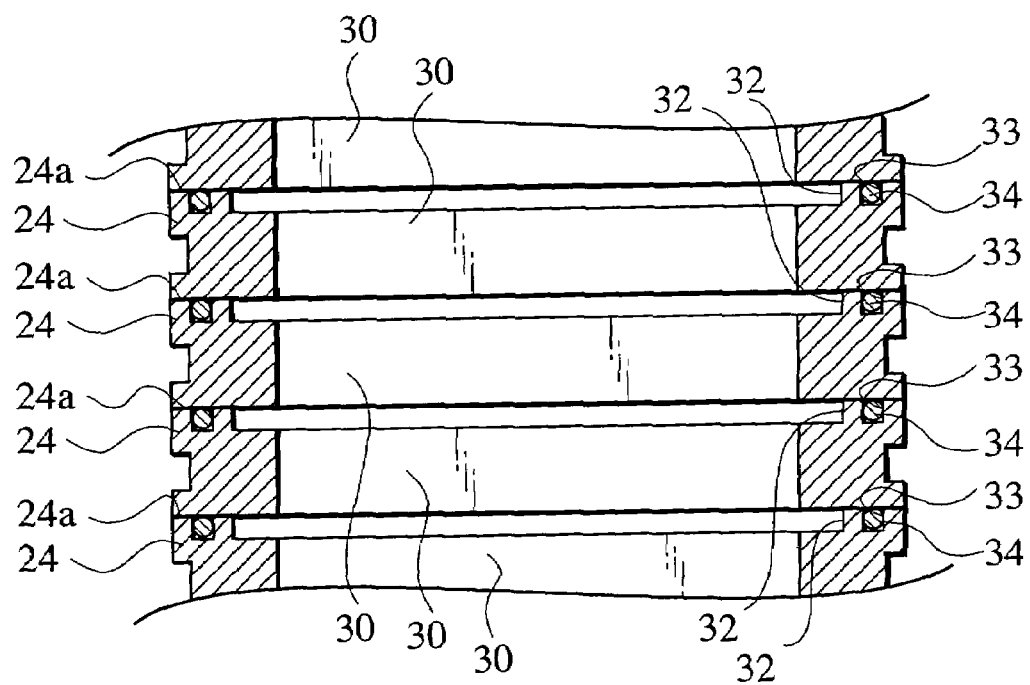
FIG. 14 is a view illustrating a condition where the cell holders of the second embodiment according to the present invention are stacked.
Figure 15:
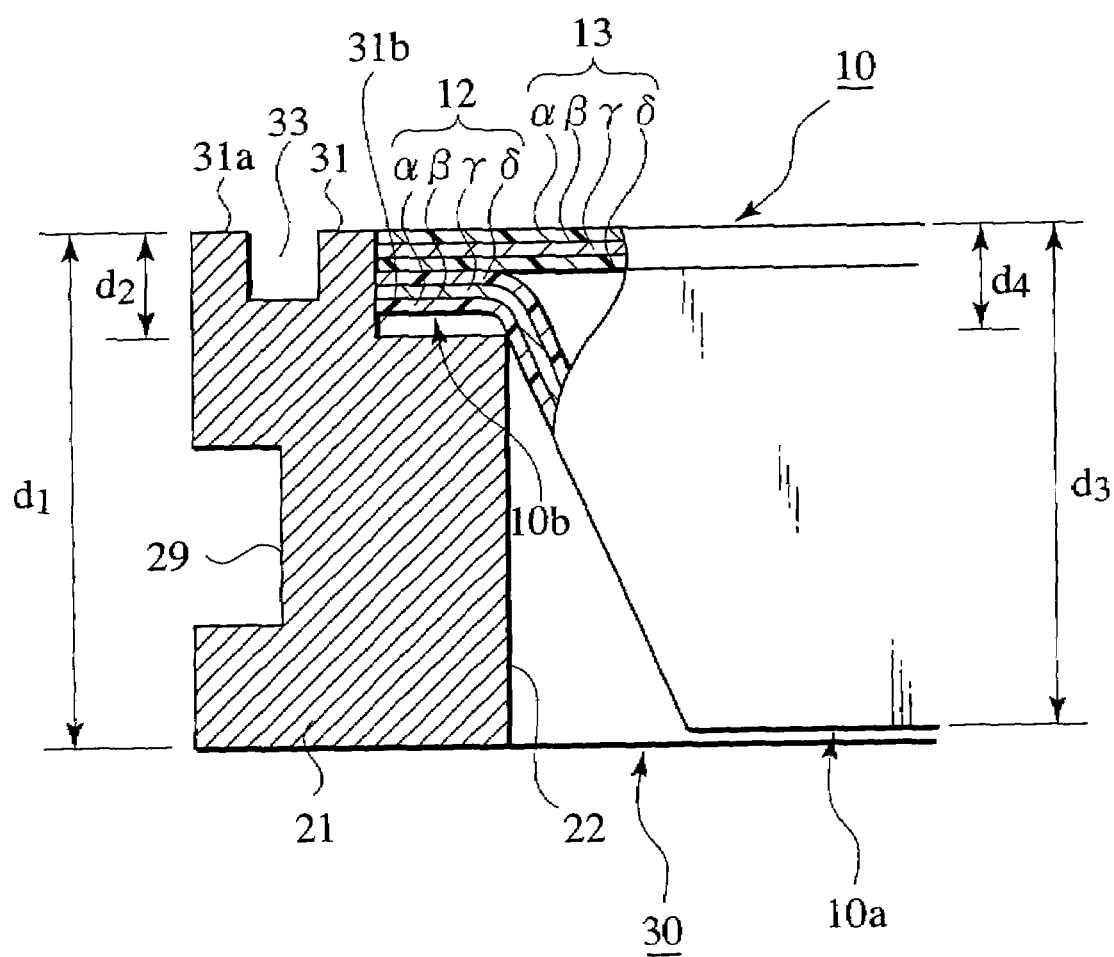
FIG. 15 is a cross sectional view of an essential part, illustrating a condition where the cell is mounted on the cell holder of the second embodiment according to the present invention.

As shown in FIGS. 13A to 15, a cell holder 30 of the second embodiment is formed with an vertical wall 31 that protrudes, in a direction in which the cell holders 30 are stacked, so as to surround a mounting surface 23 of a frame section 21 of the cell holder 30. The vertical wall 31 is formed with notched portions 32, at positions in compliance with the electrode tabs 14, 15 of the cell 10. The electrode tabs 14, 15 are enabled to be exposed through the notched portions 32 to the outside of the cell holder 30. As shown in FIG. 15, an inner side surface 31b of the vertical wall 31 is held in abutting engagement with the outer peripheral edge of the cell 10 and serves as a sealing surface to restrict the electrolyte from leaking from the joined portion 10b of the cell 10.

Further, in the second embodiment, an upper surface 31a (that is, an abutment surface facing another adjacent cell holder at an upper side in the stacking direction) of the vertical wall 31 is formed with an annular recess 33, into which an O-ring 34 is disposed as a sealing member. When the cell holders 30 are stacked, as shown in FIG. 14, the sealing member 34 is intervened between the abutment surfaces of the adjacent cell holders 30, both facing in the stacking direction, over the entire peripheries of the frame sections 21 of the adjacent cell holders 30 to form a sleeve configuration, and the cell group 10 is completely and hermetically sealed within the stacked body 3. Thus, even in the presence of leakage of liquid from the cell 10, the electrolyte liquid is securely held inside the stacked body 3.

In such a manner, according to the second embodiment, since the cell holder 30 has the inner side surface 31b that is brought into abutting engagement with the outer peripheral edge of the cell of the cell holder 30, a structure is provided which provides less probability of occurrence of liquid leakage of the electrolyte liquid from the outer peripheral terminals of the cell 10. Therefore, a module battery that has an excellent handling capability is provided.

Third Embodiment

Figure 16:
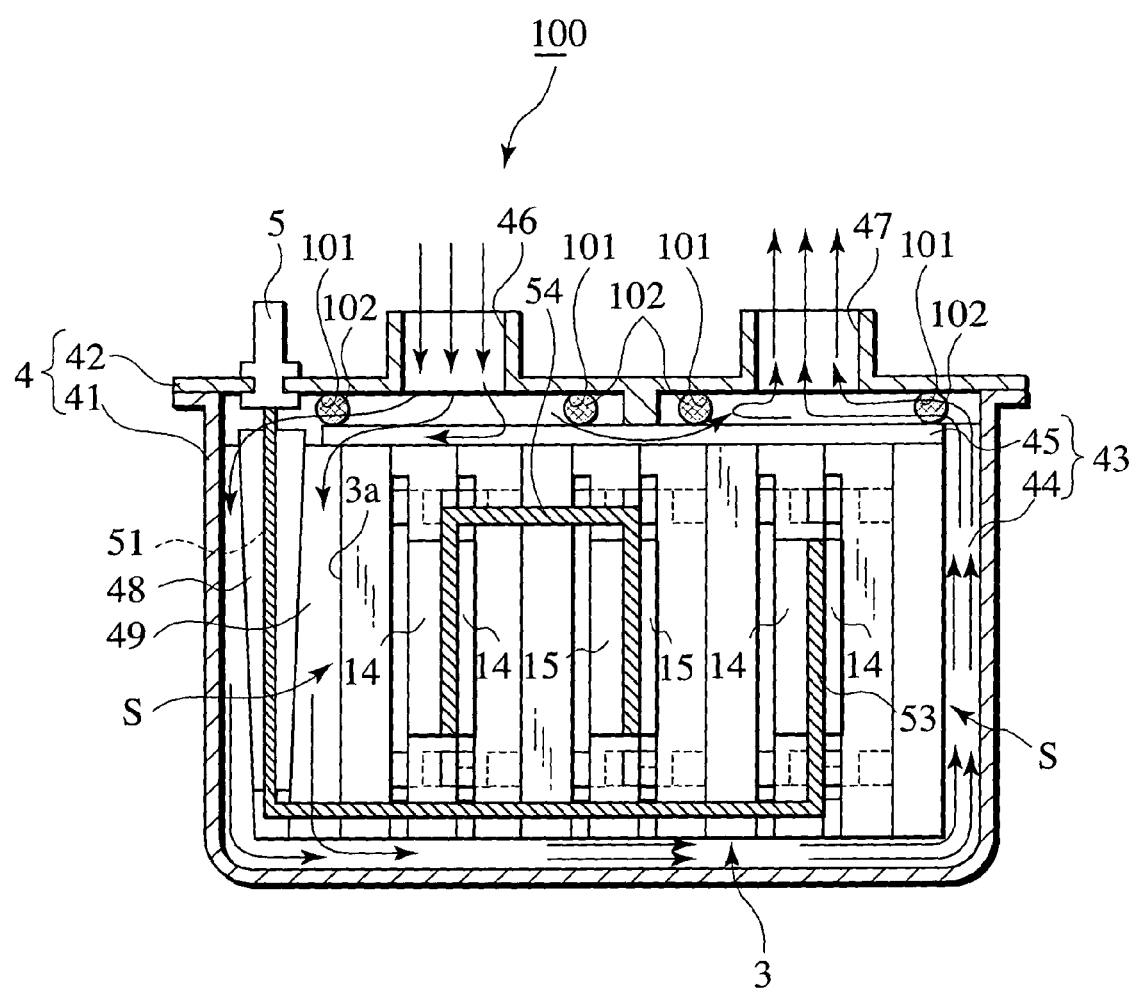
FIG. 16 is a cross sectional view illustrating a module battery of a third embodiment according to the present invention.
Figure 17:
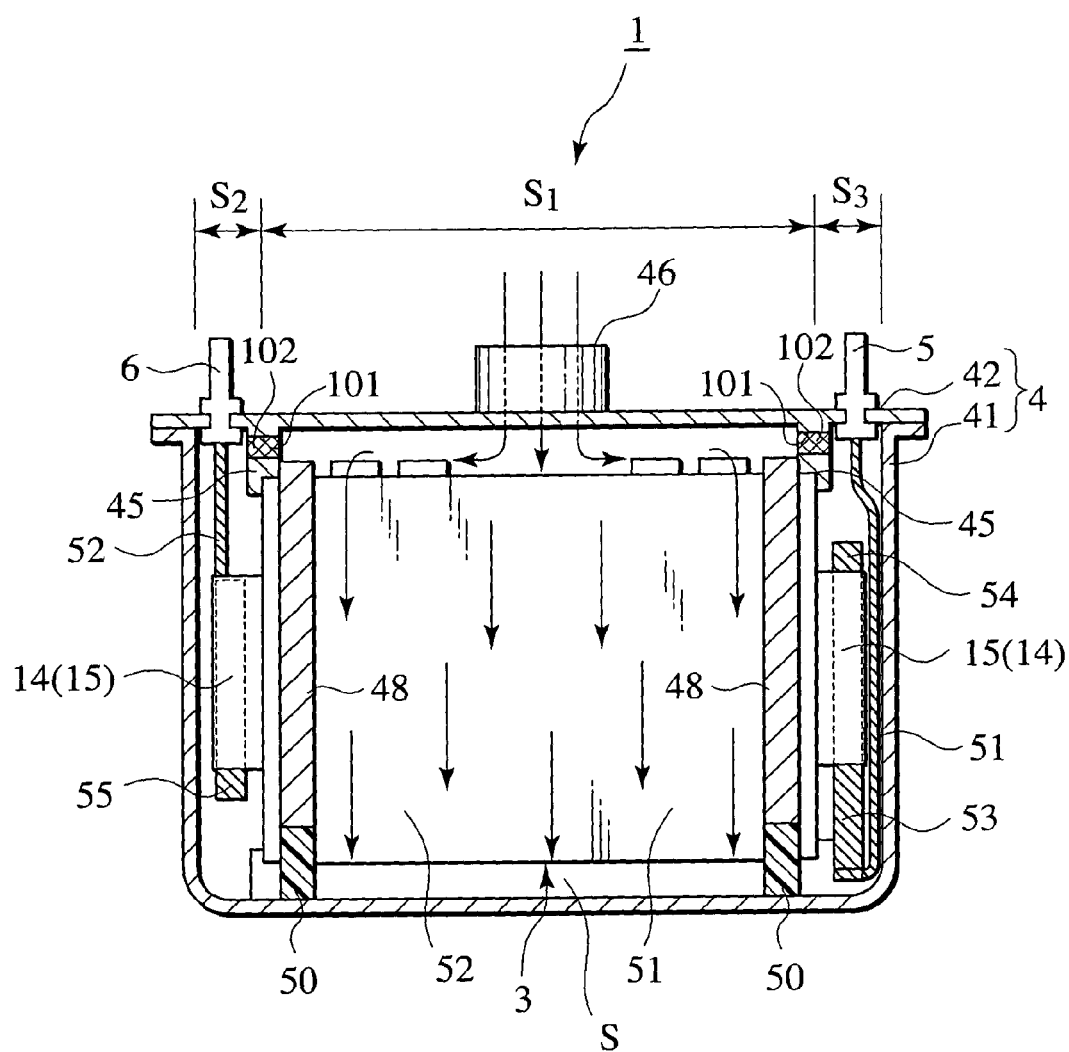
FIG. 17 is a cross sectional view illustrating the module battery of the third embodiment according to the present invention.

FIGS. 16 and 17 show a third embodiment. The same component parts as those of the first embodiment bear the same reference numerals to omit redundant description.

As shown in FIGS. 16 and 17, a module cell 100 of the third embodiment differs from the first embodiment in that a rib component 45, forming a partition wall, is formed with communicating ports 101 (communicating portion), that form a communicating section, through which communication is established between a ventilation space Si and electrode tab exposure spaces S2, S3, with each air filter 102 being covered on each communicating port 101.

According to the module cell 100 of the third embodiment, since the rib component 45 forming the partition walls (44, 45, 48, 49, 50) is formed with the communicating ports 101 to provide communication between the ventilation space S1 and the electrode tab exposure spaces S2, S3 to allow the communicating ports 101 to be covered with the air filters 102, a further improved heat dissipating property can be obtained while protecting the spaces S2, S3 from the motes of dust.

Figure 18:
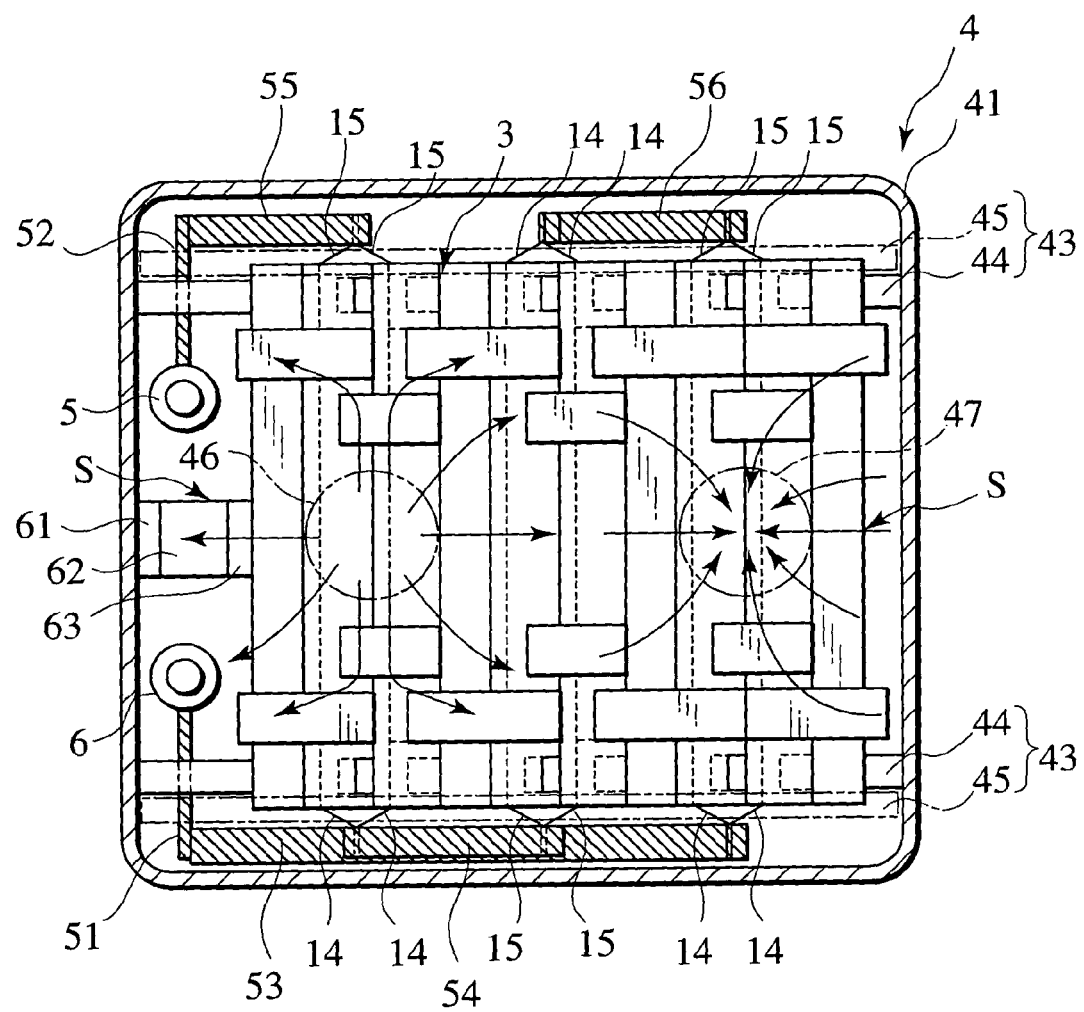
FIG. 18 is a view illustrating a modified form of a layout of wedge-shaped spacers of the module battery according to the present invention.

The present invention is not intended to be limited to the above embodiments. While in the embodiment set forth above, the wedge-shaped spacers 48, 49 are fitted between the side wall portion 57 of the module case 4 and the stacked body 3 via the rib component 44, according to the present invention, wedge-shaped spacers 61, 62, 63 may be directly fitted between the side wall portion 57 of the module case 4 and the stacked body 3 as shown in FIG. 18.

Further, in the present invention, the air filters may cover the ventilation opening 46 and the exhaust port 47. Also, while the first embodiment set forth above is structured such that the partition walls include the rib components 44, 45 and the wedge-shaped spacers 48, 49, the present invention may be such that the partition walls are formed of rib components 111 of the case body 41 and the rib components 45 of the lid member 42 as shown in FIGS. 19, 20, or may be composed of seal members if desired.

Figure 19:
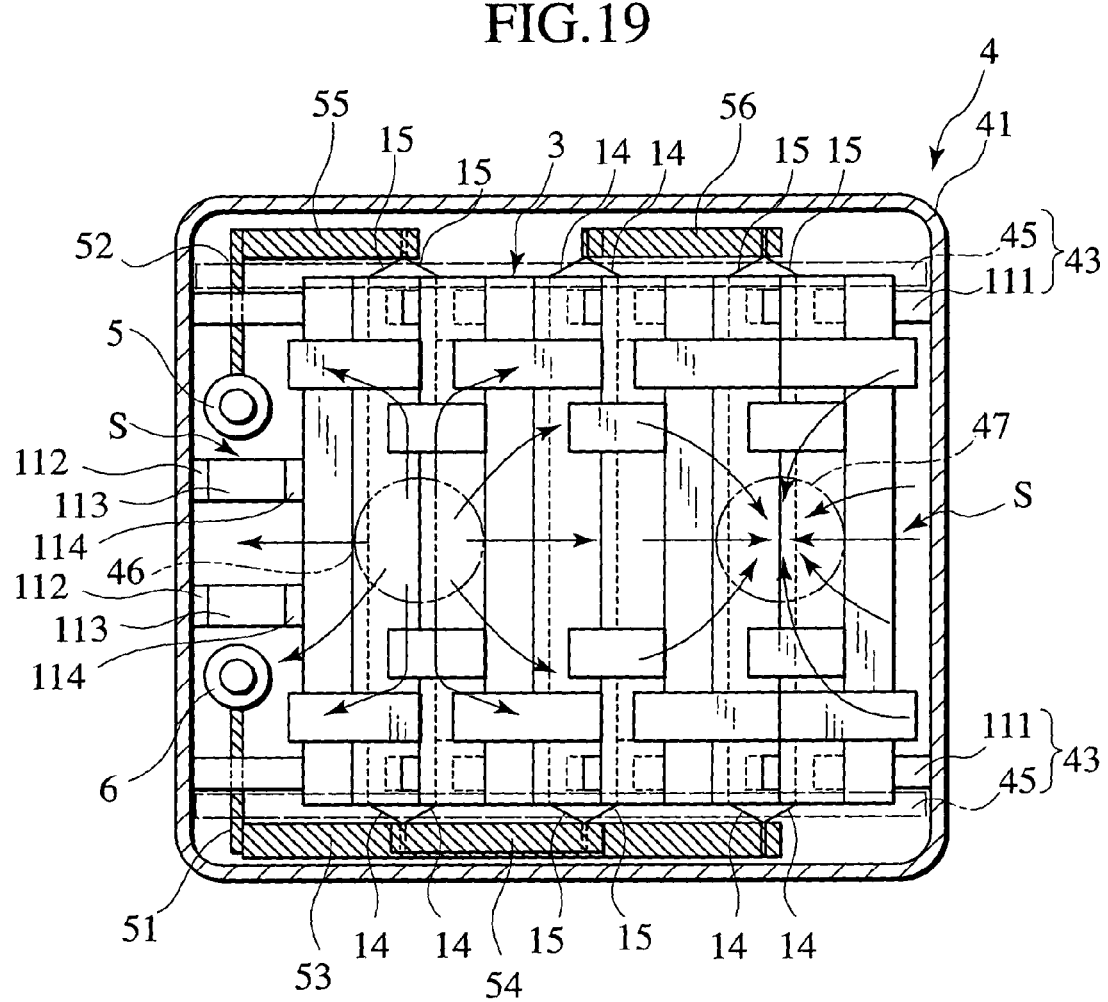
FIG. 19 is a cross sectional view illustrating a modified form of the module battery according to the present invention.
Figure 20:
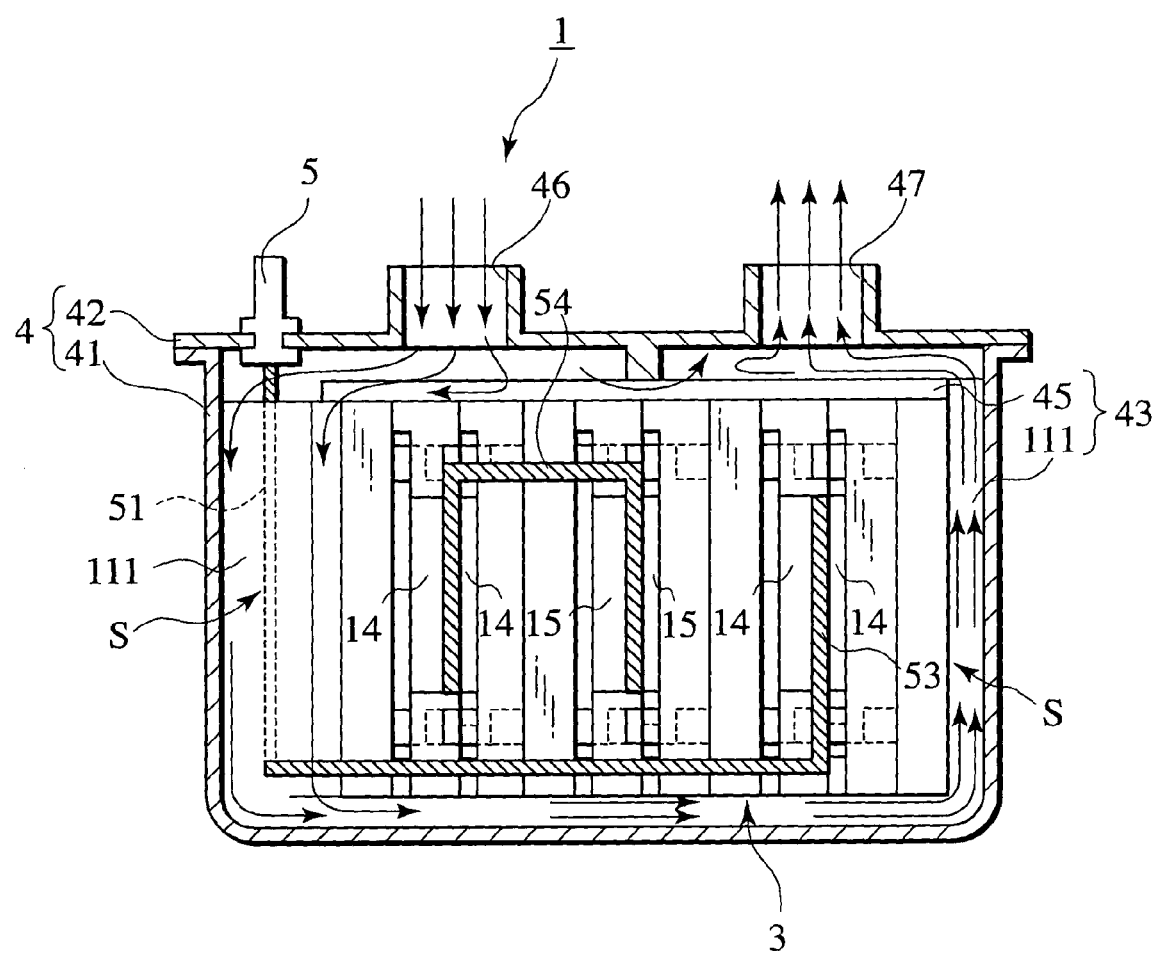
FIG. 20 is a cross sectional view illustrating a modified form of the module battery according to the present invention

Further, as shown in FIGS. 19, 20, it is of course needless to say that the layout positions of the input and output terminals 5, 6 and the layout positions of the wedge-shaped spacers 112, 113, 114 may be possibly altered in a range without departing from the spirit and technical scope of the present invention.

The entire content of Japanese Patent Applications No. P2002-214022, No. P2002-214104 and No. P2002-214163 with a filing date of Jul. 23, 2002 is herein incorporated by reference.

Although the invention has been described above by reference to certain embodiments of the invention, the invention is not limited to the embodiments described above will occur to these skilled in the art, in light of the teachings. The scope of the invention is defined with reference to the following claims.

What is claimed is:

1. A module battery, comprising:
a plurality of cells respectively having an electric power generating element hermetically sealed in a package film; and
respective cell holders on which each of the cells are mounted and held,
wherein the cell holders are formed in configurations so as to allow the cell holders to be freely stacked in a plurality of stages while permitting the cells to be retained thereon, and so as to allow electrode tabs of the cells to be exposed between cell holders neighboring in a stacking direction.

2. A module battery according to claim 1,
wherein each of the cell holders includes a locate pin, and each of the cells has a through-bore through which the locate pin of the cell holder extends.

3. A module battery according to claim 1,
wherein the cell holders neighboring in the stacking direction are structured to be freely connectable to one another.

4. A module battery according to claim 1,
wherein a plate-shaped heat sink is intervened between the cell holders neighboring in the stacking direction.

5. A module battery according to claim 1,
wherein each of the cell holders has a sealing surface which is brought into abutting engagement with an outer peripheral terminal of the cell.

6. A module battery according to claim 1,
wherein a sealing member is intervened between abutment surfaces of the cell holders neighboring in the stacking direction.

7. A module battery according to claim 1, further comprising:
a sub-assembly body, wherein the cell holders are stacked in a plurality of stages;
a module case accommodating the sub-assembly body; and
a wedge-shaped spacer fitted between the sub-assembly body and a side wall portion of the module case.

8. A module battery according to claim 7,
wherein the wedge-shaped spacer is fitted between a terminal end portion, facing in the stacking direction, of the sub-assembly body and the side wall portion of the module case.

9. A module battery according to claim 7,
wherein each of the cell holders is formed in a frame shape so as to allow each of the cells to be mounted and held, and the electrode tabs of the cells are exposed between the cell holders neighboring in the stacking direction.

10. A module battery according to claim 7,
wherein the cell holders neighboring in the stacking direction are structured to be freely connectable to one another.

11. A module battery according to claim 1, further comprising:
a sub-assembly body, wherein the cell holders are stacked in a plurality of stages; and
a module case accommodating the sub-assembly body,
wherein a space is provided between the sub-assembly body and an inner surface of the module case,
the space is divided into an electrode tab exposure space, in which the electrode tabs of the cell are exposed, and another space, and the another space serves as a ventilation space to allow atmospheric air to be ventilated.

12. A module battery according to claim 11,
wherein a partition wall causing the space to be divided into the electrode tab exposure space and the ventilation space is formed with a communicating portion that establishes communication between the electrode tab exposure space and the ventilation space, and
the communicating portion is provided with an air filter.

* * * * *